United States Patent [19]

Womack et al.

[11] Patent Number: 5,085,502
[45] Date of Patent: Feb. 4, 1992

[54] METHOD AND APPARATUS FOR DIGITAL MORIE PROFILOMETRY CALIBRATED FOR ACCURATE CONVERSION OF PHASE INFORMATION INTO DISTANCE MEASUREMENTS IN A PLURALITY OF DIRECTIONS

[75] Inventors: Kenneth H. Womack, Rochester; Brian J. Kwarta, Pittsford; David H. Outterson, Victor; James R. Reda, Rochester, all of N.Y.

[73] Assignee: Eastman Kodak Company, Rochester, N.Y.

[21] Appl. No.: 45,110

[22] Filed: Apr. 30, 1987

[51] Int. Cl.$^5$ .............................................. G01B 11/24
[52] U.S. Cl. ...................................... 356/376; 356/243
[58] Field of Search ................... 356/775, 376, 243, 1

[56] References Cited

U.S. PATENT DOCUMENTS

| | | |
|---|---|---|
| 4,009,965 | 3/1977 | Pryor. |
| 4,131,365 | 12/1978 | Pryor. |
| 4,139,304 | 2/1979 | Redman. |
| 4,340,306 | 7/1982 | Balasubramanian. |
| 4,387,994 | 6/1983 | Balasubramanian. |
| 4,391,526 | 7/1983 | McLaughlin. |
| 4,452,534 | 6/1984 | Gribanor et al. .................... 356/376 |
| 4,456,339 | 6/1984 | Sommargren. |
| 4,457,625 | 7/1984 | Greenleaf. |
| 4,490,617 | 12/1984 | Loose ................................... 356/381 |
| 4,498,770 | 2/1985 | Corwin. |
| 4,499,383 | 2/1985 | Loose ................................... 356/384 |
| 4,627,734 | 12/1986 | Rioux. |
| 4,641,971 | 2/1987 | Korth. |
| 4,641,972 | 2/1987 | Halioua. |
| 4,657,394 | 9/1987 | Halioua ............................... 356/376 |
| 4,682,894 | 7/1987 | Schmidt et al. ..................... 356/243 |
| 4,752,964 | 6/1988 | Okada et al. ........................ 356/376 |

OTHER PUBLICATIONS

K. H. Womack, "Interferometric Phase Measurement Using Spatial Synchronous Detection", Optical Engineering, vol. 23, No. 4, p. 391, Jul. Aug. 1984.

*Primary Examiner*—Richard A. Rosenberger
*Attorney, Agent, or Firm*—Martin Lukacher

[57] ABSTRACT

Projectors and cameras disposed about an object under test obtain digital moire information of overlapping aspects (views) of the object. The system is calibrated using a calibration pattern of straight lines on a flat reference surface and a projected pattern of lines which are perpendicular to the lines of the calibration pattern and contain marker fringes between predetermined lines. Each aspect is calibrated individually by stepping the calibration pattern along the axis of each camera so as to obtain a plurality of tables which relate phase information to distance in each of a plurality of planes spaced successively closer to the camera. The calibration tables define a calibrated volume in space between the cameras and projectors. When the object under test is located in this volume, the video signals from the camera are converted into digital moire information. This information is directly related to the calibration information and is converted with the aid of the calibration information into absolute distance measurements along the perimeters of cross-sections through the object.

35 Claims, 18 Drawing Sheets

- DATA POINTS: Shown as pixels 122, 128, 134 in Fig 7A
- X STORED VALUES: Interpolated from DATA POINTS, these values are always stored for pixels $128 \pm 6n$

METHOD AND APPARATUS FOR DIGITAL MORIE PROFILOMETRY CALIBRATED FOR ACCURATE CONVERSION OF PHASE INFORMATION INTO DISTANCE MEASUREMENTS IN A PLURALITY OF DIRECTIONS

BACKGROUND OF THE INVENTION

The present invention relates to digital moire interferometry, and particularly to a system and method using a calibrated volume to provide absolute measurements of distance from digital moire phase information obtained from an object under test, regardless of phase ambiguities in such information.

The invention is especially suitable for use in machine vision systems for measuring the contour of three dimension objects through selected cross-sections thereof. Such measurements may be used for inspection of objects as well as for defining their location in space.

Digital moire techniques are known where a line grating is projected on an object under test. Digitized video information is obtained with a camera viewing the object under test at an angle with respect to the axis of the optics which project the grating. Phase information is derived from the digitized video using a spatial synchronous algorithm (by convolving the digitized video information from the camera with orthogonal reference sine and cosine functions). See K. H. Womack, "Interferometric Phase Measurement Using Spatial Synchronous Detection", Optical Engineering, Vol 23 No. 4, Page 391, July/August 1984. Phase information obtained as a result of such measurements is only relevant with respect to a reference plane and becomes ambiguous at distances greater than a half period of the projected grating as it is viewed at the camera. Techniques for removing the ambiguity have involved taking into account the geometric relationship of the projector and the camera (triangulation) to obtain a reference plane and stepping of the grating to different positions along the path of the light projected on the object in order to obtain phase information representing the profile of objects which are large with respect to the grating. See U.S. Pat. No. 4,641,972 issued Feb. 10, 1987.

Other schemes for resolving the ambiguity in making contour measurements have involved use of light of different wavelengths, synchronously moving the object under test and the projector and/or camera optics or providing other special geometric orientation of the optics. Various examples of such schemes are described in the following patents, which deal with contour measurements using interferometry techniques, and which also describe complex computational processes used in deriving the phase information from the video signals: U.S. Pat. Nos. 4,456,339 issued June 26, 1984; 4,498,770 issued Feb. 12, 1985; 4,641,971 issued Feb. 10, 1987 (the last three patents involve multiple frequency systems); 4,131,365 issued Dec. 26, 1978; 4,391,526 issued July 5, 1983; 4,457,625 issued July 3, 1984; and 4,627,734 issued Dec. 9, 1986 (the last four patents involve moving optics/object systems); 4,009,965 issued Mar. 1, 1977; 4,139,304 issued Feb. 13, 1979; 4,340,306 issued July 20, 1982; and 4,387,994 issued June 14, 1983 (the last four patents involve contour measurements using spatial orientations of the projection and detection optics).

In the various systems and techniques which have heretofore been proposed, measurement accuracy is limited by the alignment of the various optical elements (the projectors and the cameras or other photoelectric detectors), aberrations in the lenses and the proximity of the reference plane to the surface of the object under test from which the projected light is reflected. In addition, the measurements provided by such systems are only the relative phase with respect to the reference plane.

SUMMARY OF THE INVENTION

It has been discovered in accordance with the invention that an absolute measurement of surface coordinates (dimensions in a plurality of coordinates) can be obtained by calibrating the phase information with respect to a calibration grating (hereinafter also referred to as a ruling) in a plurality of planes at different incremental distances from the detector (e.g. a video camera). For surface coordinates of a solid object successive aspects (which may also be considered as views) of the calibration grating are used. The information obtained from the calibration is stored in tables to provide a calibrated volume, such that measured phase values can be converted directly into distance measurements (to dimensional coordinates in a reference coordinate system). Since the calibration takes into account the geometric orientation (alignment) of the optical elements and the aberrations and other distortions of the optical elements (of the projector and video camera) and any distortion in the sensors (the video camera), the absolute measurements are automatically compensated for any such misalignments, aberrations and other distortions.

A profile of a three dimensional object can be provided by utilizing a plurality of camera and projector arrangements which cover different aspects of the object. The volume in space which is covered by each camera and projector arrangement is calibrated so as to provide a three dimensional volume in which the object under test can be located. The measurements of the distances defining the profile of the object under test through a cross-section thereof is obtained by combining the information obtained from each of the several aspects which are covered by each camera/projector arrangement.

It is a feature of the invention that errors in the precision of the measurements are determined by the accuracy of the calibration grating and the mechanical stage on which it is located. These errors are therefore controllable to the degree of precision required, for example a fraction of a thousandth of an inch.

Accordingly, it is the principal object of the present invention to provide an improved system of and method for profilometry, both of surfaces and three dimensional objects, which provides absolute measurements of the dimensions thereof with precision and which is not limited by misalignments, aberrations or distortions in the optical elements or sensors of the system.

It is another object of the present invention to provide an improved system for making profile measurements both of surfaces (two dimensional objects) and three dimensional objects with precision and without the need for scanning or shifting the position of the detectors with respect to the object under test to provide measurements of large objects.

It is a still further object of the present invention to provide an improved method and system for precision measurements by interferometry which eliminates ambiguities in phase measurements and provides absolute measurements of distance defining the contour of objects under test, whether in two or three dimensions.

It is a still further object of the present invention to provide an improved contour measurement system which utilizes spatial phase measurements to correct for the effect of temperature fluctuations on the geometry of the system.

It is a still further object of the present invention to provide an improved method of and system for profilometry in which a ruling is projected upon an object under test wherein the ruling provides a fringe pattern encoded, as with marker fringes (marked ruling lines) between predetermined lines of the ruling, so as to provide information as to absolute distances of the surface under test from a reference position irrespective of ambiguities in the phase information.

The foregoing and other object features and advantages of the invention as well as the best mode now known for carrying out the invention will become more apparent from a reading of the following description in connection with the accompanying drawings, listed below.

DESCRIPTION OF THE FIGURES

FIG. 8 shows the location of the projected Ronchi grating in successive calibration planes $Z_n$ and $Z_{n+1}$ and also showing the location of an intermediate plane. The figure illustrates how the cumulative phase measurements made at the calibration planes may be interpolated to determine the phase measurement and the distance at an intermediate plane between the calibration planes.

in FIG. 12A the images of a cylindrical object of elliptical cross-section imaged at each of three different cameras, 120° apart as shown in FIG. 2.

DETAILED DESCRIPTION

Figure 1:
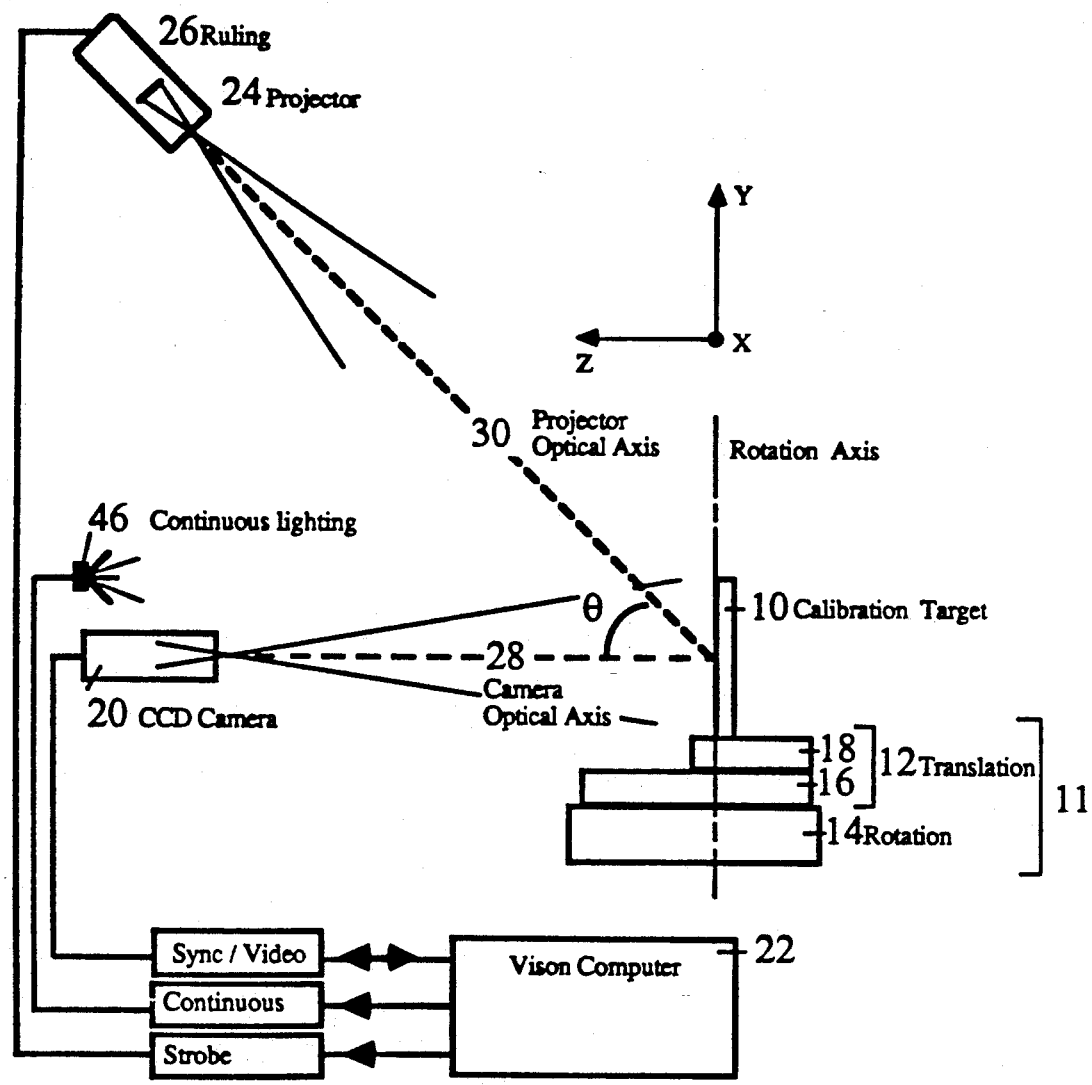
FIG. 1 is an elevational view schematically showing a system embodying the invention.
Figure 2:
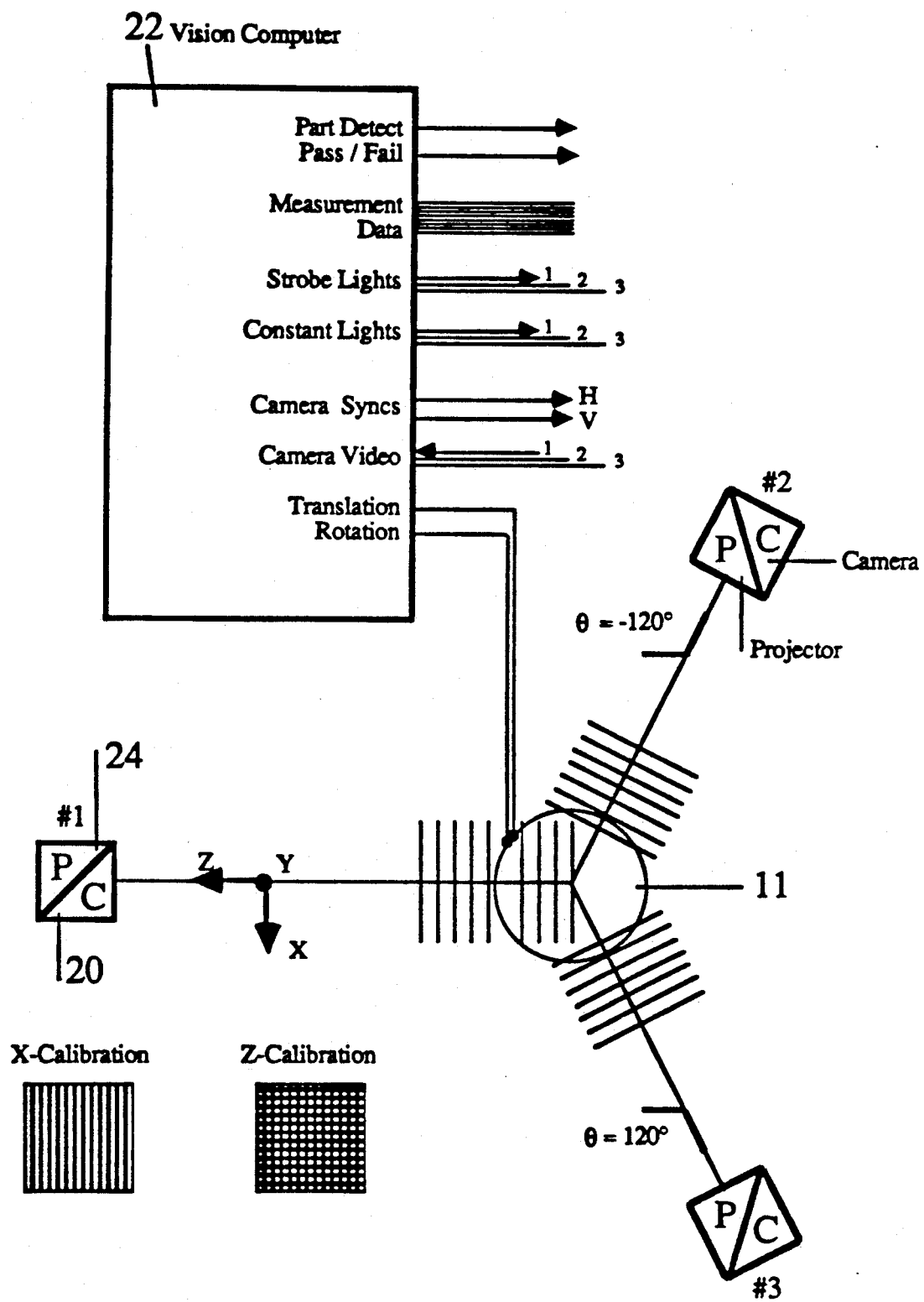
FIG. 2 is a plan view schematically illustrating a system embodying the invention which is capable of measuring the profile of an object in three dimensions.

Referring to FIGS. 1 and 2 there is shown, the profilometer system in accordance with an embodiment of the invention set up for calibration. A calibration fixture 11 has a calibration target 10 mounted on a stage 12 and 14 which permits the target to be rotated about a vertical axis which is indicated as the "y" axis and translated along the "z" axis. The stage includes plates 16 and 18 mounted on a table 14 which provides for rotation. The plate 18 is translatable in the z direction. The surface of the plate 18 is leveled with reference to gravity. After calibration the calibration fixture 11 is removed and the object under test are located in the calibrated volume. The objects, for example, may be bodies for which the contour of a cross section is to be determined. These bodies may be moved through the calibrated volume on a conveyor belt which is also leveled to gravity so that the axis of the body is approximately along the y axis.

The translation stage is designed to enable the calibration target to move through 32 planes, $Z_{0-31}$. The 0th plane is through the y axis and the other z planes are a fraction of the period of a line pattern from a Ronchi ruling which is projected on the calibration target. This pattern in an exemplary embodiment may have a period of ¼ inch. The translation steps may then suitably be ⅛ inch.

While the steps may be equally spaced, their spacing is not critical as long as they are less than half the period of the ruling as projected on the calibration target. The resolution of the calibration and also of the profile measurements depends upon the period of the ruling. It has been found that, with a period of approximately ¼inch, measurement accuracy to ±0.001 inch is obtainable.

The calibration target is rotatable to three positions 120° apart as shown in FIG. 2. In each of these positions, the calibration target, which presents a flat surface on which the vertical pattern shown in FIG. 3 appears, is located opposite a projector camera assembly. These assemblies are indicated as PC#1, PC#2 and PC#3 in FIG. 2. All of these assemblies are identical. PC#1 includes a video camera which is preferably a charge couple device or CCD camera which has a CCD sensor array. The array may be a matrix of about 320 horizontal and about 250 vertical elements. The video signals from these elements are digitized in a computer system 22 which is connected to the camera 20. The video image is digitized into a matrix of 256 horizontal and 240 vertical elements (pixels) as represented by bytes of digitized information from the CCD sensor elements. Each of these elements of digitized information corresponds to a pixel of the field viewed by the array. This field is focused on the array by a lens in the camera. The focus is set to the mean location of the surface being imaged, with a suitable depth of field to cover the calibrated volume. Since the digitized array has 256 pixels in the horizontal direction, the center pixel is 128, the column of 240 pixels along the center (pixel 128 in each row) is aligned with the y axis in the plane of the z axis (the zy plane). Such alignment may be accomplished manually using conventional positioning devices.

The projectors each include a projector lens which focuses light projected through the variable period Ronchi ruling 26 on the plane of the calibration target. While the optical axis of the camera is aligned with the z axis and is horizontal, the optical axis of the projector is tilted at an acute angle, suitably 45° to the optical axis of the camera. The camera optical axis is indicated at 28 and the projector optical axis is indicated at 30. These axes are aligned to be in the z,y plane using the positioning devices.

Figure 4:
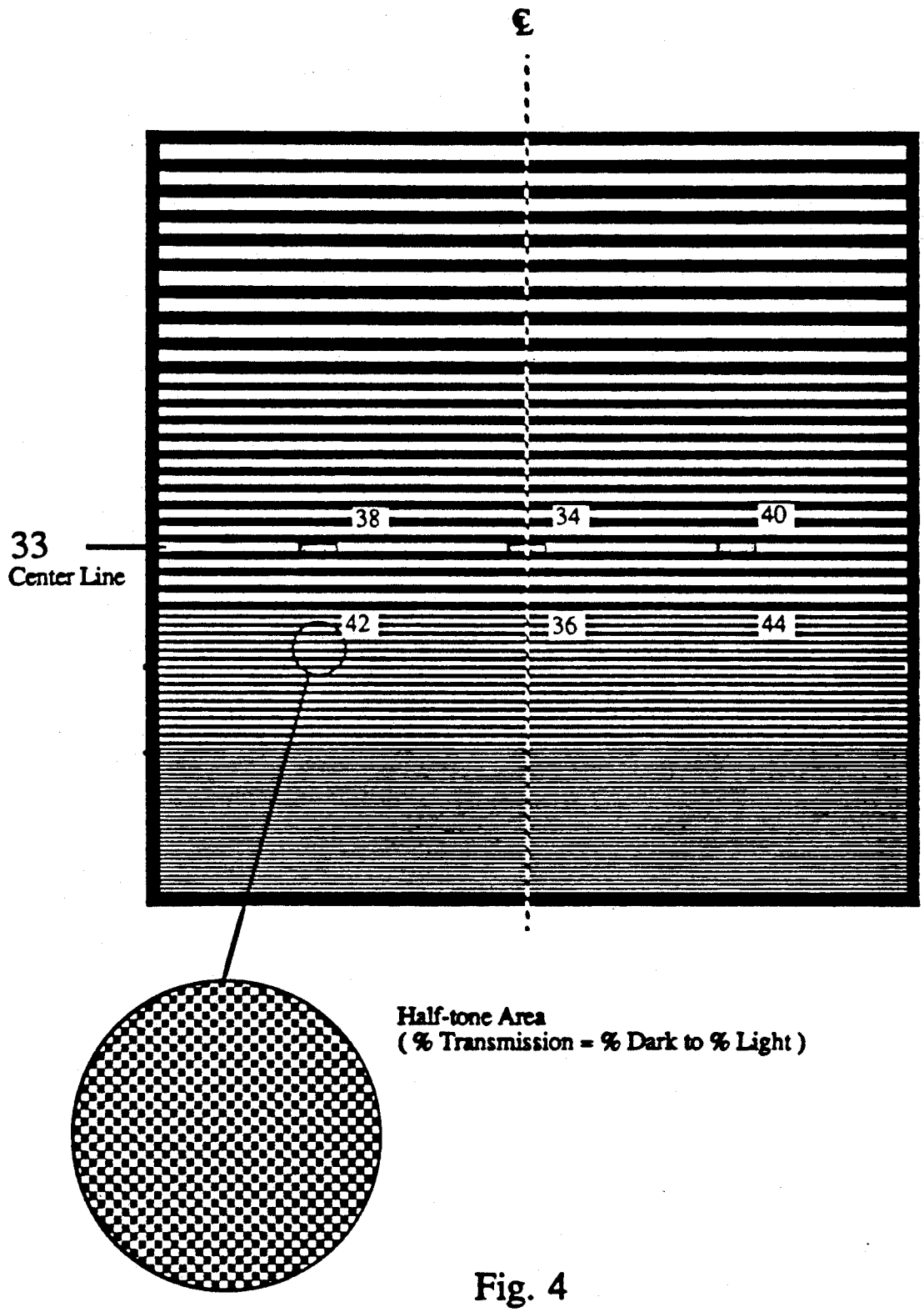
FIG. 4 is a view of a variable frequency Ronchi grating used in the system shown in FIGS. 1 and 2; the grating having marked lines which provide marker fringes between predetermined rulings (the ruling along the horizontal center line of the grating and the next vertically displaced ruling and rulings eight periods below the marked ruling) so as to enable calibration of a large volume where the object under test might be located.

The Ronchi ruling 26 is illustrated in greater detail in FIG. 4. It desirably has a variable period. When an inverting projection lens is used, the lines are closer at the top than at the bottom. The variable spacing compensates for the tilt of the projector axis 30 so that the projected lines are parallel and equally spaced on the calibration target 10 when in place or upon objects under test.

While the projection lens is shown approximately focused when the calibration target is slightly displaced toward the camera from the vertical axis at $Z_0$, the optimum focus is set for the location of the calibration target surface in the middle of its translation range (at step 16). The focus of the camera 20 may be similar. The F stop of the projector and camera is selected to provide a depth of field over the entire translation range.

The Ronchi ruling as shown in FIG. 4 contains at line 33, which extends along the middle of the grating, perpendicular to the constructive center line, an area which provides a marker fringe 34. Also between lines spaced below the center ruling 33 and intersecting the center line is another marker fringe area 36. The lower fringe 36 may be eight lines below the center fringe 34. Optionally, there may be additional marker fringes between the same lines as the lines containing the fringes 34 and 36 equally spaced from these lines. These additional marker fringe areas on opposite sides of the center fringe area 34 are indicated at 38 and 40. The additional marker fringe areas on opposite sides of the lower center line fringe area 36 are indicated at 42 and 44. The fringes adjacent to ruling 33 are 75% transmissive, as compared to totally transparent (100% transmissive), the marker fringes 36, 42 and 44 between the lower lines are suitably 85% transmissive. The amount of transmissivity and the relationship of the transmissivities of the fringes may be varied or reversed. In addition further marker fringes spaced downwardly or upwardly from the center line may be used in order to provide a larger area in the z direction which can be calibrated and used (providing a larger calibrated volume for the object under test). As shown in the enlargement in FIG. 4, the selected transmissivity is provided by a half tone area where the percentage transmissivity is determined by the percentage of the transparent to dark areas of the half tone.

Another optional means for covering and calibrating over a larger area in the z direction is to use a reduced angle of tilt, for example less than 45° between the optical axes 28 and 30. The use of additional marker fringes for covering larger areas is preferred since greater resolution is obtained than would be the case by decreasing the tilt angle.

Each of the camera projector assemblies PC#1-#3 covers a separate aspect (or view) of the object under test and the calibrated volume; 120° aspects in this embodiment. Each 120° aspect is calibrated separately so as to cover the entire volume. FIG. 2 illustrates the $Z_0$ plane for the aspect viewed by P/C#1, which is along the rotation axis (y) and several of the additional z planes each of which is successively closer to the camera. Exemplary z planes for the other aspects which are viewed by the other camera and projector assemblies are also shown.

Figure 3:
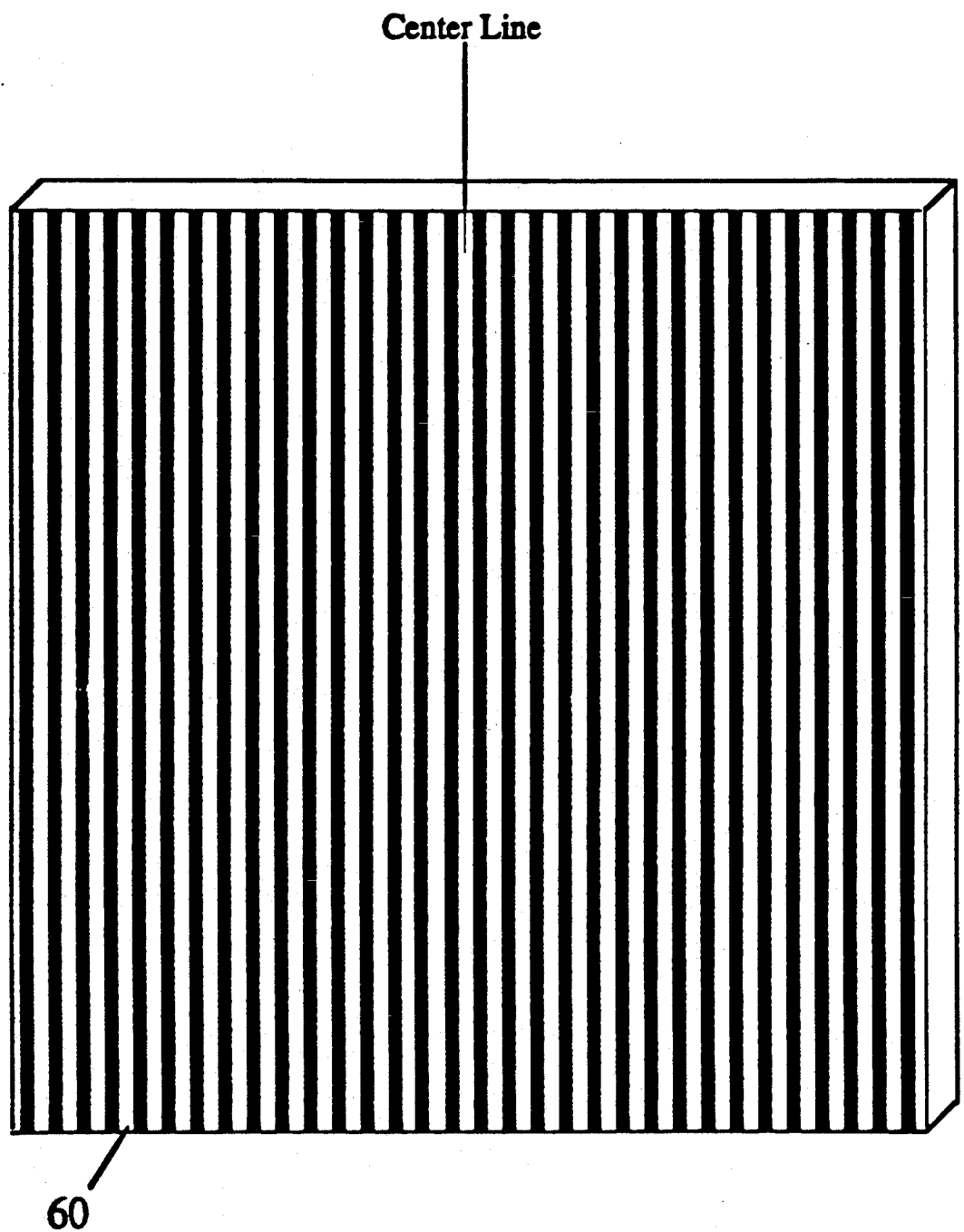
FIG. 3 is an elevational view of the calibration target which is used in calibrating the system illustrated in FIGS. 1 and 2.

The calibration target is shown in detail in FIG. 3. It has accurate rulings which may be fabricated by a photolithography process on a planar surface, such as a glass plate. The lines are suitably ⅛ inch wide black lines separated by a ⅛ inch white space, thereby providing a ¼ inch period. The selection of line spacing is governed by the resolution required, the field of view to be covered, and the receptor matrix in the sensor used. Since the accuracy of the calibration depends upon the precision of the lines, they are desirably made to an accuracy which exceeds the measurement of accuracy of the system, for example an order of magnitude more accurate than the desired measurement accuracy. The exemplary target may be a square plate 8 inches on a side. The flatness of the ruled surface of the plate is preferably an order of magnitude higher than the resolution of the measurements (e.g., in this case 0.0001 inch). It is desirably mounted in the calibration fixture 11 so that the lines are parallel to the rotation axis. The alignment of the camera projector assemblies is facilitated by the outer marker fringes so that the projected ruling pattern at the target will constitute lines which are perpendicular to the lines of the calibration target. The alignment is not critical since the calibration process compensates for errors in alignment and also for aberrations in the lenses and sensors of the camera and projector.

The projector is illuminated by a strobe lamp (not shown) which may be connected to the projector housing by fiber optics. A general illumination light source is provided on each camera projector assembly. A typical one of these light sources is a lamp shown at 46. These lamps provide diffuse lighting and illuminate the calibration target. They may be incandescent lamps. The projection strobe lamps for each projector and the illumination lamps for each camera are controlled by the computer 22. The computer provides horizontal and vertical sync signals to each camera. Separate control lines are provided for the projector strobe lights and the camera constant illumination lights 46. The computer also controls the rotation and translation of the stages 12 and 14 by operating stepper motors connected to the stages. These stepper motors and appropriate gearing are not shown to simplify the illustration.

The computer processes the video information both for calibration and during tests on actual objects (run time). The computer system for both calibration and run time is described hereinafter in connection with FIGS. 11-15. The calibration process utilizes the calibration target rulings and the projected Ronchi pattern. Their use and the operation of the system during calibration will become more apparent from FIGS. 5-10.

The system may be compensated for temperature variations as will be explained more fully below. Also in order to minimize the adverse effects of environment, including ambient light, it is desirable that the entire system be enclosed in a chamber. This chamber may be maintained slightly above atmospheric pressure in order to minimize air currents and to exclude dust which might cause optical interference. In the event that the facility in which the system is used is subject to vibration, it is also desirable to mount the entire system on a table which is isolated for vibration. It is also desirable to avoid large temperature changes (e.g., greater than ±5° F.); smaller changes are accommodated by a temperature control function described hereinafter. The system may be enclosed in a chamber which is temperature controlled to prevent such large temperature changes.

In general, calibration is carried out to map the relationship of phase and distance in a plurality of planes (the z planes) which extend between the rotation axis and the cameras. These maps contain the phase and distance relationships at a plurality of different heights in the y direction. Each height may be considered to include a window which extends in the horizontal direction.

The calibration is carried out first using the calibration target alone illuminated with the constant illumination from the respective lamps 46. A phase measurement is then made from which the distances in the x direction from the center of the vertical lines on the calibration target is obtained. Distance is correlated to the positions of the pixels across the row, i.e., the distance of each pixel from the center pixel. Because the vertical lines of the calibration pattern have a predetermined spacing (¼ inch in this example), the phase measurements are also directly correlated with distance. There may be 32 horizontal windows. By limiting to 32 windows, the computer memory capacity is reduced. More or fewer windows may be used, if desired. The windows are located at y values $y = 138 \pm n6$, where n is an integer. y may vary from 42 to 228. Each window contains 32 data points, which again may be increased or decreased as desired. The 32 points used are defined at pixels, $x = 128 \pm n6$. n is an integer and x is in the range from 32 to 218. Thus, there are 16 points (pixels) on one side of center; 15 on the other side of center; and at center, thereby defining a total of 32 data points per window. There are 32 calibration windows per plane, and there are 32 calibration planes $Z_0$ to $Z_{31}$. Thus there are a total of 32 matrices of 32 by 32 values of distance/pixel information. 32 pixel positions in 32 windows are calibrated. X calibration, Z calibration, and a marker fringe table in each z plane are completed before stepping the target to the next plane closer to the camera.

Next the Ronchi ruling with the marker fringes is projected onto the calibration target by flashing the strobe lamp. The relative position of the window $W_i$ with respect to the marker fringe is determined. Any other one of the horizontal windows may alternatively be used. This is done by storing phase information as to the location of the marker fringe and phase information as to the location of the window plus the number of lines of the projected pattern (horizontal lines) between the marker fringe and the window. This number of lines is determined by counting the cycles of 360° of phase variation between the marker fringe and the window. It will be appreciated that the marker fringe location is indicated by a dip in the pattern of intensity variation along the vertical or y direction. This pattern would normally be sinusoidal because of the equally spaced lines of the projected grating. The 75% and 85% fringes can be discriminated by the difference in the amplitude of the intensity variations. During some measurements for the location of the marker fringe, the fringe 34 at the center of the projected pattern may move out of the field of view. This may occur at planes close to the camera. Then the other fringe 36 will appear. Since it is of different transmissivity, the detection thereof can be used in place of the central marker fringe 34 merely by adding the phase displacement corresponding to the number of lines of separation between the fringes 34 and 36. In this example there are eight lines or 8 times 360° of phase displacement.

Absolute phase information between the marker fringe and the window is measured in unwrapped phase. The meaning of unwrapped phase will be apparent from FIG. 10. The sawtooth curves indicated by the dash lines marked $\phi$ represents absolute phase versus distance. At each period of the pattern, phase varies 360°. Unwrapped phase as indicated by the line marked $U(\phi)$ is the unwrapped phase. The 360° cycles of phase variation are cumulative; thus as the distance along the projected ruling between the location of the marker fringe and the location of the window increases, the unwrapped phase will increase. For example, consider the absolute phase over the distance indicated as Δx in the figure. Δx starts at 315°, passes through 360°, and continues for another 45°. In terms of absolute phase measurement, Δx is ambiguous because of the transition in the absolute measurement. In terms of unwrapped phase the ambiguity is removed. At the end of the Δx interval, the unwrapped phase measurement is 360° plus 45° or 405°. Of course the absolute phase measurement is only 45°, and this measurement is ambiguous as to the location of the Δx interval with respect to x.

By measurement of the unwrapped phase between the marker fringe and the window at each plane of the 32 planes from $Z_0$ to $Z_{31}$, a phase number corresponding exactly to the plane is obtained. This phase number corresponds exactly to distance in the z direction since the phase number for phase $Z_0$ corresponds to the plane at the axis of rotation (the vertical axis through the origin—see FIG. 1—which is the axis about which the stage 12 rotates). The phase number for the plane $Z_1$ corresponds to a plane $\frac{1}{8}$ inch away from the axis in the z direction, the phase number for the plane $Z_2$ corresponds to a plane $\frac{1}{4}$ inch from the axis of rotation and so forth. A table of the phase numbers therefore precisely locates all of the planes in the z direction.

Maps calibrating each of these z planes in terms of the phase at each calibrated pixel position along the window are obtained by making absolute phase measurements at each pixel position. This phase is compared to the phase found for that pixel at the preceding plane. The difference accumulated, is referred to as Z-calibration. These illuminated pixel positions are those pixels between the vertical lines on the calibration target. Not every pixel is measured, because for some, the projected ruling pattern is of low visibility due to the dark rulings on the flat calibration surface of the target 10. In general, due to perspective effect, the pixel at which the phase is determined is not the pixel at which the calibration values are stored. By a linear interpretation of adjacent phases, the phase at the calibration pixel may be found. Maps of phase measurements are made taking into account the phase measurements at the $Z_0$ plane. At $Z_0$ there is no preceding plane. The phase map thus originates there. Each calibration pixel phase (recall this may be interpreted from the phase of adjacent pixels) begins as an offset from the center phase (phase at pixel 128). This compensates for aberration and distortion in the optics and sensors (cameras, etc.). The center phases are taken as zero at the $Z_0$ plane and constitute the link between the marked fringe array and the Z-calibration array.

There are 32 planes of phase maps which provide the z calibration for each aspect, there is a total of 3 times 32 or 96 maps for the three dimensional system shown in FIGS. 1 and 2. Since the x calibration obtained under constant illumination of the calibration target relates the pixel positions in each of these planes to distance, and since the z calibration maps of phase information permit conversion of the phase information to distance in an orthogonal direction, absolute distance measurements in an (x,z) cartesian system are made during run time.

Figure 5A:
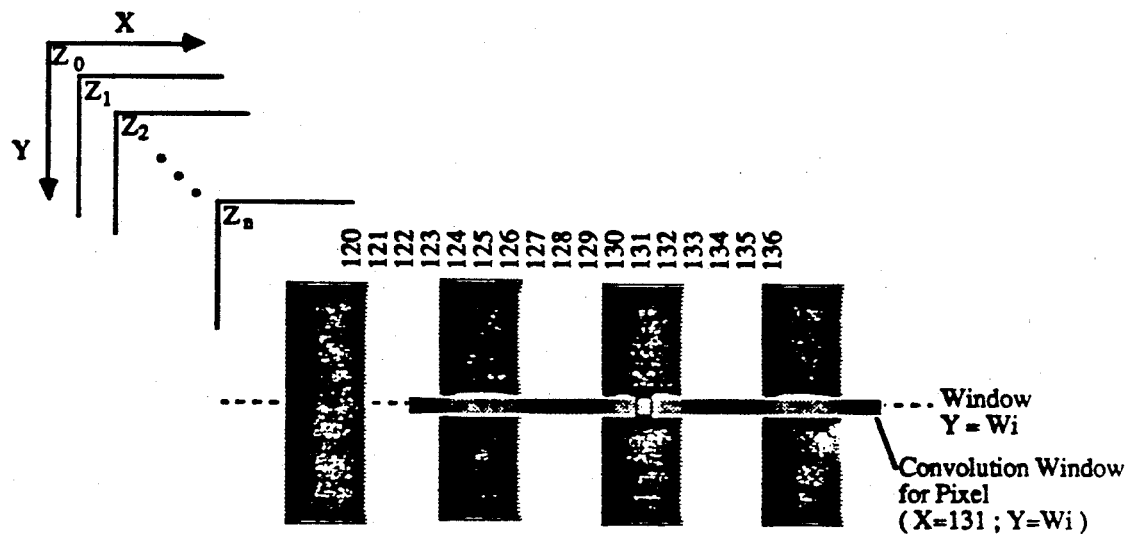
FIG. 5A shows a portion of a horizontal window at a height $W_i$; the window containing a pattern of lines of the calibration grating (FIG. 3) about the center line thereof as imaged on the sensors of the camera. The horizontal window reflects a row of pixels at $y = W_i$, which is calibrated. There are 32 calibration windows. The figure is calibrated in accordance with the location of the pixels sensed along a horizontal line—256 pixels with pixel number 128 at the center line and 126 pixels on either side of the centerline.
Figure 5B:
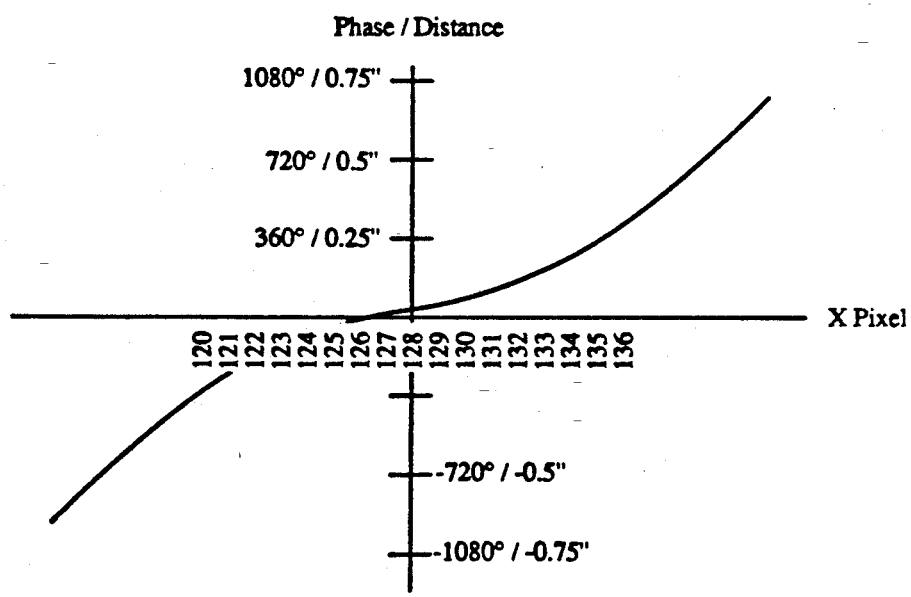
FIG. 5B is a curve illustrating the variation in the phase measured at the pixel locations on the right side and left side of the center line, respectively. The correspondence between distance and phase being shown on the ordinate of the curves.

X-calibration will become more apparent from FIG. 5A where a plurality of the lines of the calibration target are shown. Shown is the calibration procedure used to calibrate window $W_i$ of plane $Z_n$. There are 32 calibration windows, $W_i$, at each Z plane. These are the lines about the center line or pixel 128 as viewed by the camera. A convolution window one pixel wide in the y direction and 25 pixels long in the x direction is moved both to the right and to the left of the center line. These phase measurements relating the pixels along the row encompassed by the window are shown in FIG. 5B in terms of unwrapped phase. Since each cycle of unwrapped phase (each 360° of unwrapped phase), corresponds to a $\frac{1}{4}$ inch (the distance between the centers of the white spaces between the lines), there is a direct correlation in the x direction between phase and distance. These distance measurements are stored in a separate region of computer memory for each plane, $Z_0$-$Z_{31}$. The x calibration as shown in FIGS. 5A and B is carried out under constant illumination and before the projector strobe is illuminated to project the Ronchi pattern onto the calibration target.

Figure 6A:
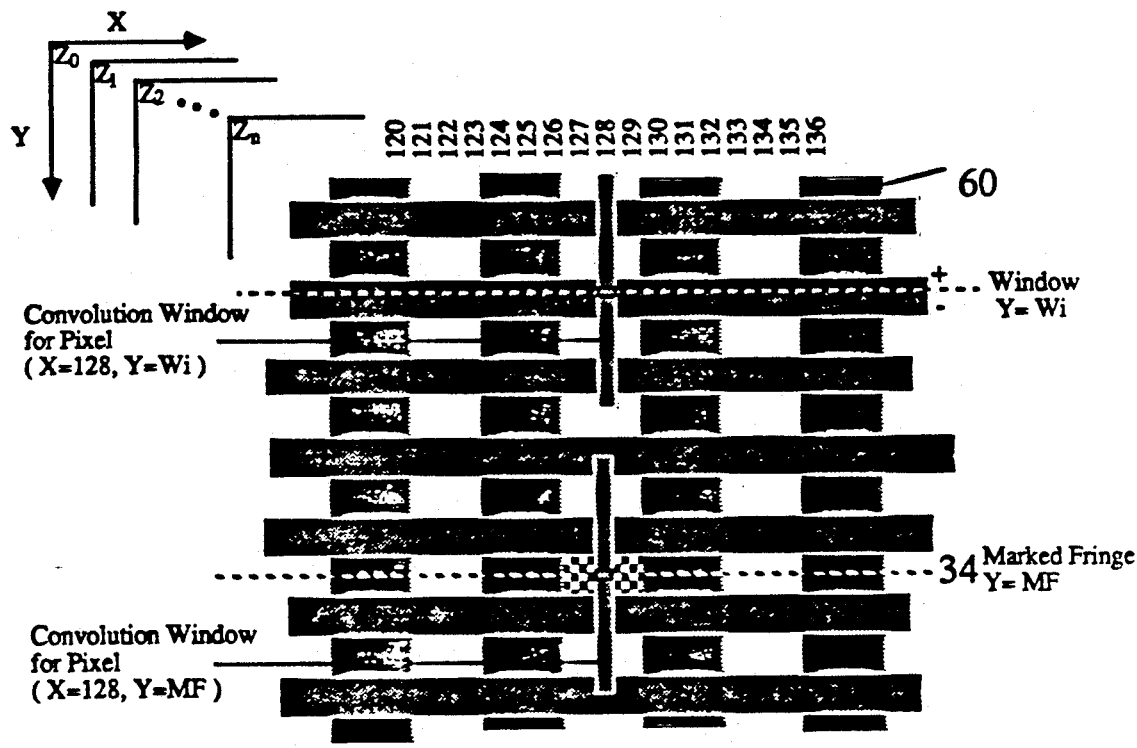
FIG. 6A is a diagram showing the window illustrated in FIG. 5A with the projected Ronchi grating superimposed thereon and showing the location of the marker fringe along the center line of the Ronchi grating when the calibration target (FIG. 3) is stepped to a certain location, $Z_n$ closer to the camera than an initial location of the calibration target at $Z_0$.

Calibration of the window, $W_i$, location using the marker fringes will be more apparent by referring to FIG. 6A which shows the portion of the window and also the portion of the pattern projected on the camera having the marker fringe 34. The total cumulative phase from the position of the marker fringe $y_{mf}$ to the position of the window $y_{wi}$ is $\phi mf$. Total cumulative phase varies in each plane, $Z_n$. This cumulative phase takes into account the number of lines of the projected pattern between the marker fringe and the window. The phase measurements are made using a convolution window 1 pixel wide in the x direction and 25 pixels wide in the y direction. The spacing between lines will encompass at least 3 pixels. Thus, as the convolution window moves upwardly from $y_{mf}$ to the position of the window $y_{wi}$, there will be a sinusoidal variation in phase with each period of such variation corresponding to movement of the window a distance equal to the period between lines of the projected pattern. By counting the number of these lines and adding $2\pi$ times the number of lines to the phase difference between the absolute phase measurements at the position of the marker beam $y_{mf}$ and at the position of the window $y_{wi}$, the cumulative phase is determined. This cumulative phase is stored for each $Z_n$ plane in the z direction ($Z_0$ to $Z_{31}$) and correlates the distance of these planes from the rotation axis to the phase measurements.

Figure 8:
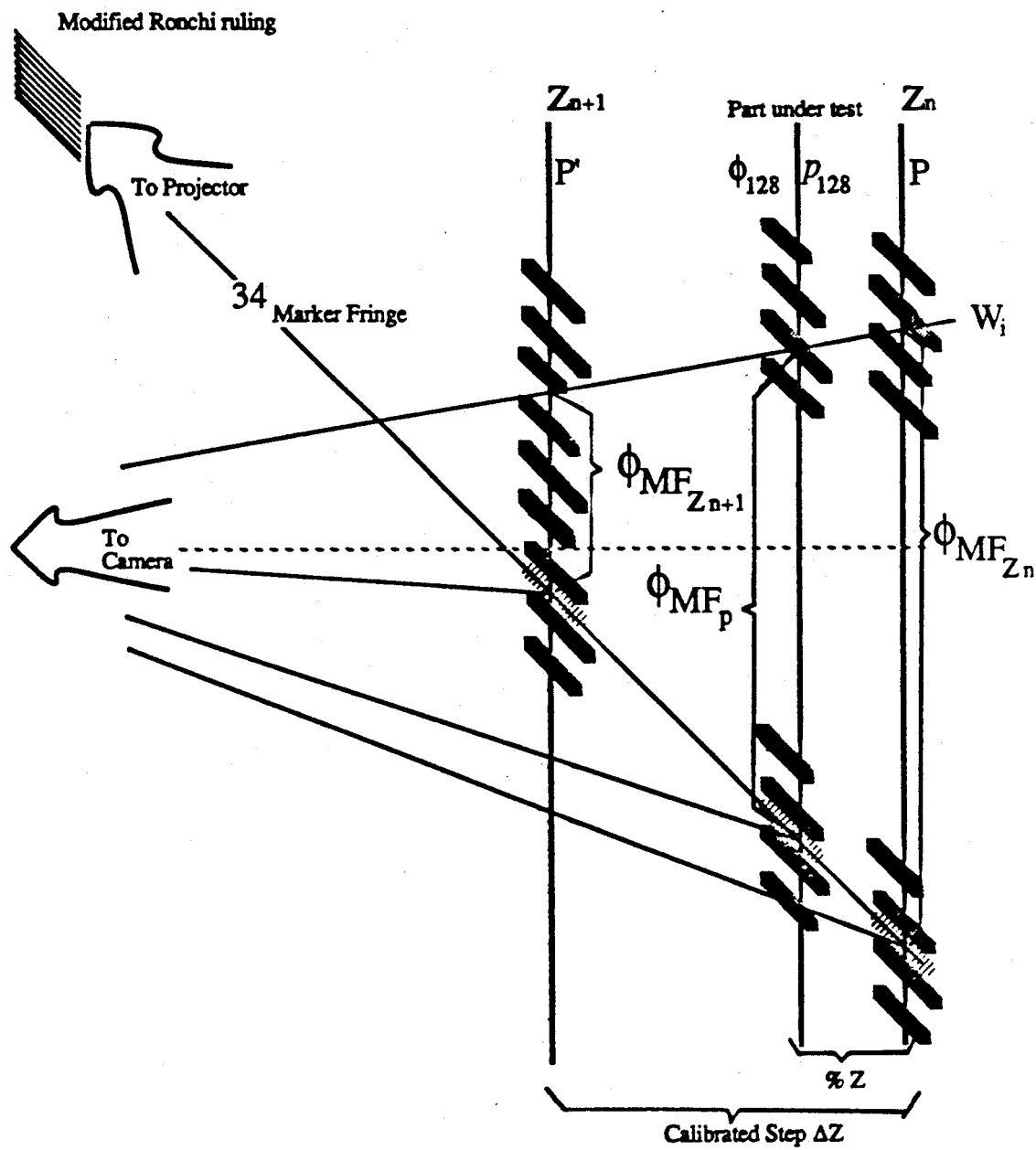
FIG. 8 is a diagrammatic view in an elevational orientation as shown in FIG. 1.

FIG. 8 shows how the position of the marker fringe with respect to the window varies in the different planes. Two planes are shown $Z_n$ and $Z_{n+1}$, $Z_{n+1}$ being the plane adjacent to $Z_n$ which is closer to the camera. The window $W_i$ is the location of a certain row of pixels of the sensor array. Due to the convolution nature of this window, it must be located at a distance greater than 12 rows either from the top or bottom of the array (from y=12 to y=228). The reason for the appearance of 12 rather than 13 results from the final value of the convolution array being zero rather than a significant number. Because of the tilt between the optical axis of the projector and optical axis of the camera, the marker fringe traverses upwards as the calibration plane moves closer to the camera. A consequence of parallax causes the window height, $W_i$, to decrease as the calibration plane moves closer to the camera.

While the marker fringe 34 is shown, it will be appreciated that in some cases, particularly in planes close to the camera, the lower marker fringe 36 will be used and the unwrapped phase corresponding to the 8 cycles (8 lines) between these marker fringes 34 and 36 will be taken into account in the stored value of $\phi_{mf}$.

Figure 6B:
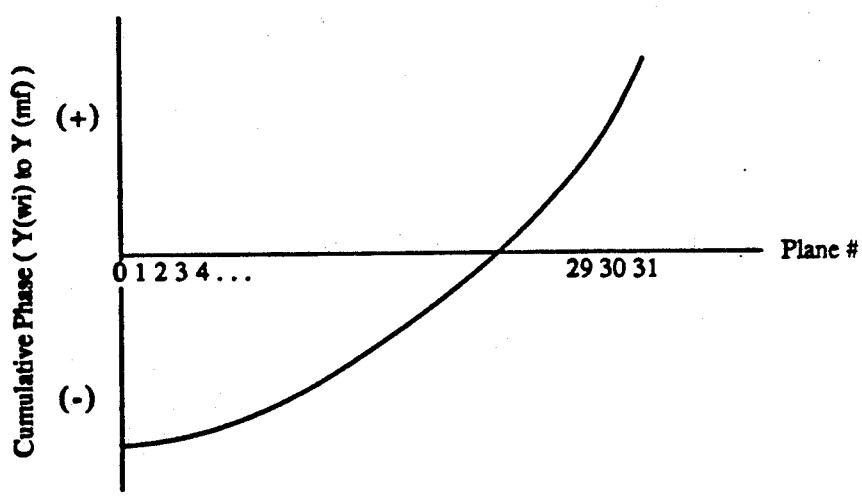
FIG. 6B is a curve showing the cumulative phase (the phase measurement at the window to the phase measurement at the marker fringe plus the number of 360° phase transitions therebetween) for each plane at which the calibration grating (FIG. 3) is located, plane $Z_0$ being furthest from the camera and plane $Z_{31}$ being closest to the camera.

FIG. 6B shows the variation in cumulative phase $\phi_{mfzn}$ with the planes as the planes move closer to the camera. The plane at the origin Z has a certain cumulative phase. This phase continues and then reverses as the location of the marker fringe moves to the opposite side of the window $W_i$.

In FIG. 8 there is shown also between the $Z_n$ and $Z_{n+1}$ planes, a plane indicating the location of the surface of an object or part under test as would be the case during the run time after calibration. The plane of FIG. 8 is taken through the center line (a plane including the axis of rotation and the optical axes) so that pixel 128 will be intersected by this plane. This pixel is indicated at $p_{128}$ in FIG. 8. The measurement of cumulative phase is $\phi_{mfp}$ is proportional to the distance from the origin of the $Z_n$ and $Z_{n+1}$ planes. The phase measurements correlate to this distance in accordance with the following relationships which define the depth between the $Z_n$ and $Z_{n+1}$ planes (%Z)

$$\%Z = (\phi mfz - \phi mfp)/(\phi mfz_n - \phi mfz_{n+1})$$

where is the cumulative phase from the window $W_i$ to the marked fringe for plane $Z_n$, $\phi mfz_{n+1}$ the cumulative phase from the window $W_i$ to the marked fringe for plane $Z_n+1$, and is the cumulative phase from $W_i$ at the surface of the part under test to the marked fringe.

The distance of the surface of the object Z at pixel 128 is then obtained by the following expression $$Z = Z_n + \%Z (\Delta Z). \tag{2}$$

In this example the size of the step ($\Delta Z$) is ⅛ inch. $Z_n$ is the size of the step times the number of the plane from the origin. For example plane 8 ($Z_n=8$) is 1" from the origin. Accordingly, the cumulative phase information directly provides an absolute measurement of the distance from the origin of the surface of the part.

Figure 7A:
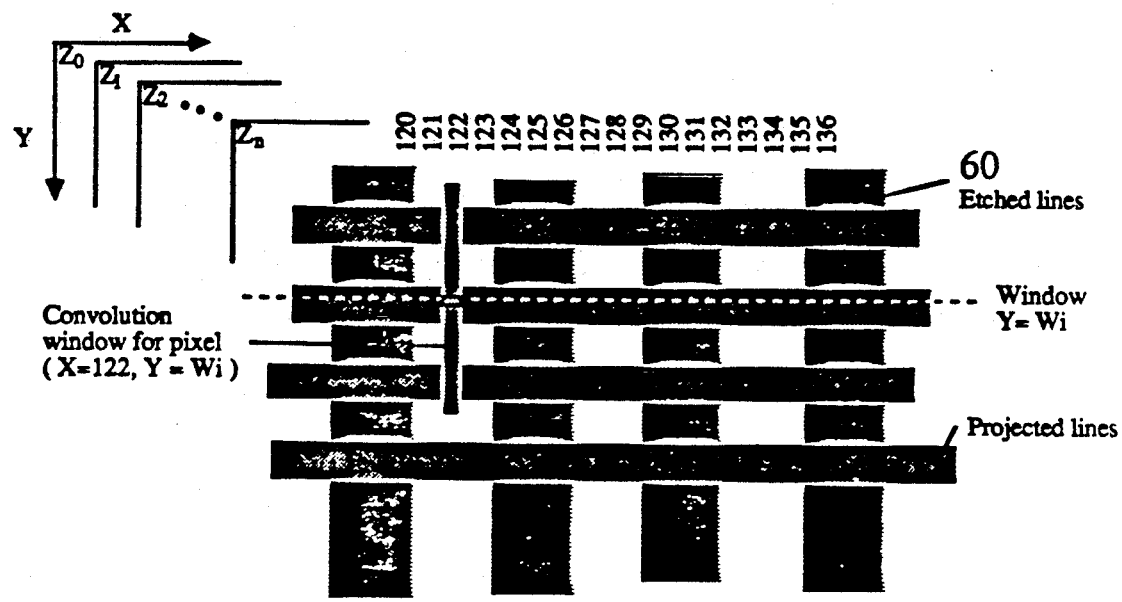
FIG. 7A is a diagram similar to FIG. 6A showing the location of a convolution window which is used to measure the phase in the horizontal direction along a window $W_i$. These phase measurements being used for calibration in each of the planes $Z_0$ to $Z_n$ in which the calibration grating (FIG. 3) may be located. $Z_0$ being the plane at the origin with higher numbered planes being successively closer to the camera.
Figure 7B:
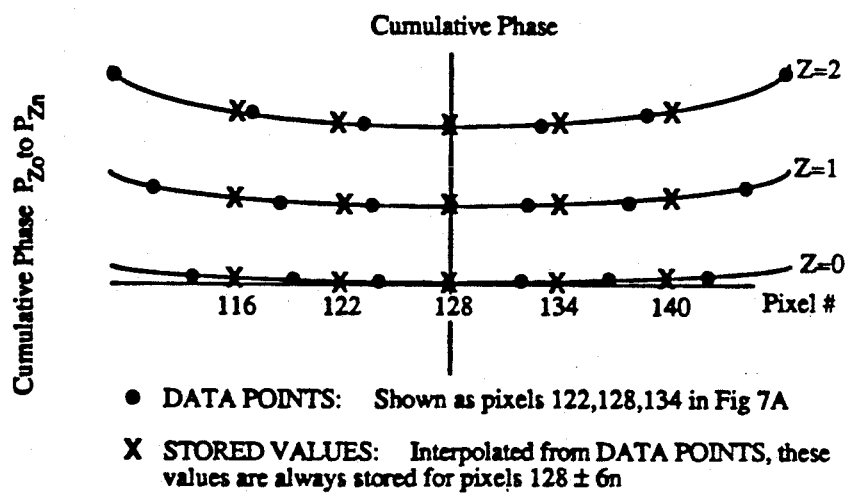
FIG. 7B is a series of curves showing the cumulative phase between measurements with the convolution window at different pixel positions for each of three successive planes $Z_0$, $Z_1$ and $Z_2$; the remaining planes not being shown to simplify the illustration.

Z-calibration will become more apparent from FIGS. 7A and 7B. The calibration is shown taking place at a window $y_{wi}$. It will be appreciated that a plurality of such windows, for example 32 windows, may be used and located anywhere between y=12 and y=228. In the present embodiment, as discussed above, y=138±n6, for y=42 to 228. The convolution nature of the window, limiting the extent to which the calibration windows approach the boarders was also discussed earlier.

In FIG. 7A only the pattern of the calibration target (vertical bars) and the projected pattern (horizontal bars) in the vicinity of the center line (pixel 128) is shown. The calibration bars are marked "etched lines" and the lines of the projected pattern are marked "projected lines" in FIG. 7A. Initially the $Z_0$ plane is calibrated. This is accomplished by moving the convolution window and making phase measurements at the pixel positions which are exposed between the etched lines. In FIG. 7A these are pixel positions 116, 122, 128, 134 and 140 for plane $Z_n$. It is noted that these pixel locations will vary with plane number, as consequence of parallax. Absolute phase measurements are made by the synchronous detection process which is discussed in the above-identified article by Womack and will be discussed further below in connection with the computer operations. The phase measurements are cumulative phase with respect to the $Z_0$ plane and the phase measurements in the $Z_0$ plane are taken into account in the cumulative phase measurements for all of the other 31 z planes in each 120° aspect. By taking into account these phase measurements, misalignments and aberrations are automatically compensated.

The phase information for the $Z_0$ plane may be stored in terms of the difference in the phase measurements at the pixel positions outward from the pixel 128 along the center line to the phase at pixel 128. Thus if the system were perfect without aberrations or misalignments, the phase measurements at each of these pixels would be 0. However due to aberrations and misalignments the phase measurements can vary. Therefore the value stored for phase at each pixel position will vary to accommodate these misalignments and aberrations. Recall that unwrapped phase was discussed in connection with FIG. 10 above. As the measurements of phase are made in each of the other planes, for example plane $Z_1$, differences between the phase at each pixel location measured in plane $Z_1$ from the measurements at corresponding pixel locations at plane $Z_0$ are derived. To these difference values there is added accumulated phase from the previous plane. In the case of plane $Z_1$ this will be the stored values for plane $Z_0$. In case of plane $Z_2$ the calculated values for plane $Z_1$ are then added to the absolute cumulative phase values at corresponding pixel positions. It will be seen that the numbers representing the phase values increase as the planes move closer to the camera. In order to increase resolution these numbers may be multiplied by a scaling factor, for example 8k (8096) (for each 180°).

FIG. 7B illustrates how the cumulative phase values changes as the planes come closer to the camera in the pixel positions 116, 122, 128, 134 and 140 about the center of the sensor array. The curvatures take into account lens and sensor aberrations and characteristics, parallax errors and alignment errors.

Figure 9:
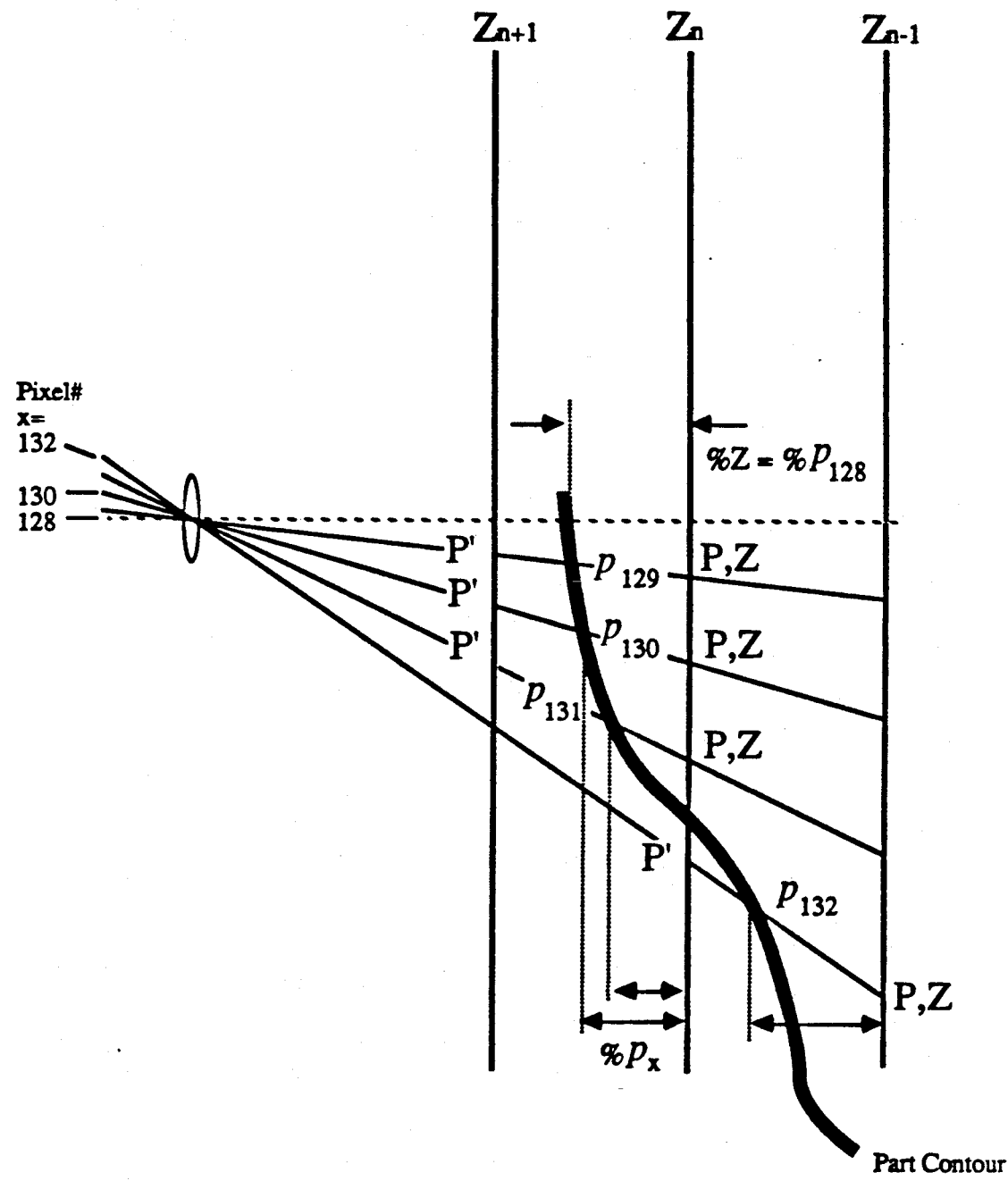
FIG. 9 is a view in a horizontal plane of the calibration planes $Z_n$ and $Z_{n+1}$ and also another calibration plane $Z_{n-1}$ further from the camera than $Z_n$ and showing the location of the surface of the object under test with respect to these planes so as to illustrate how the phase measurements at each pixel location in each plane through a cross-section of the object is mapped to the distance of the object, directly from the phase information using the z calibration information which is plotted in FIG. 7B.
Figure 10:
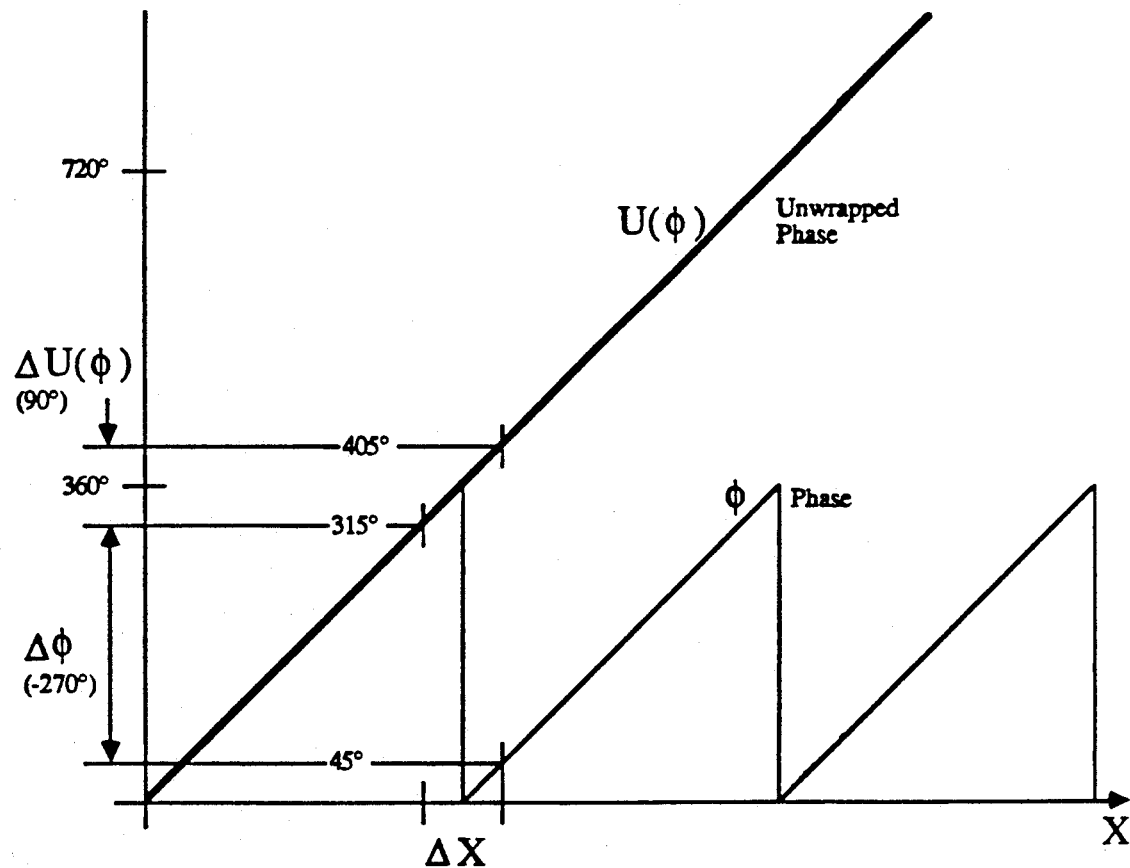
FIG. 10 is a diagram showing the relationship between absolute phase ($\phi$) and unwrapped phase $U(\phi)$ which takes into account successive 360° transitions. The curves show how absolute phase measurements are ambiguous, and how the ambiguity can be removed through the use of unwrapped or cumulative phase.

The Z-calibration phase values are used directly by interpolation to locate the surface of an object as shown in FIG. 9 wherein the surface of a part is depicted passing through plane $Z_{n-1}$, $Z_n$ and $Z_{n+1}$. The absolute distance calculation for each of these pixels can be calculated from the cumulative (unwrapped) phase difference in accordance with the following relationships, wherein x is the pixel number where the Z distances is to be measured, $\phi_x$ is the phase at the pixel x, $\phi_{x-1}$ is the phase at the x−1 pixel adjacent to the x pixel, P is the cumulative phase to plane $Z_n$ (just before—further from the camera than—the unknown distance), P' is the cumulative phase to plane $Z_{n+1}$ (just after the unknown distance), $P_{x-1}$ is the cumulative phase in the x direction at the x−1 pixel, $P_x$ is the cumulative phase in the x direction at the x pixel, Z and Z' are the distances from the origin of the calibration planes which straddle the distance to be measured, and U is the unwrapped or cumulative phase.

$$U(\Delta\phi) = U(\phi_x - \phi_{x-1}) \tag{3}$$

$$P_x = P_{x-1} + U(\Delta\phi) \tag{4}$$

$$\%p_x = (P - p_x)/(P - P') \tag{5}$$

$$Z_x = Z + \%p_x(Z - Z') \tag{6}$$

By way of an example for the surface measured at pixel 129 ($p_{129}$) the absolute distance at $Z_{129}$ may be determined using the following calculations.

$$U(\Delta\phi) = U(\phi_{129} - \phi_{128}) \tag{7}$$

$$p_{129} = p_{128} + U(\Delta\phi) \tag{8}$$

$$\%p_{129} = (P - p_{129})/P - P') \tag{9}$$

$$Z_{129} = Z + \%p_{129}(Z - Z') \tag{10}$$

As the calibration values exist for $x = 128 \pm n6$, for those pixels which are not calibrated, values are interpolated from those which are. For example in equations (7) to (10) the values for P and P' representing pixel 129 are interpolated from the calibrated values at pixels 128 and 134.

RUN TIME

Figure 11A:
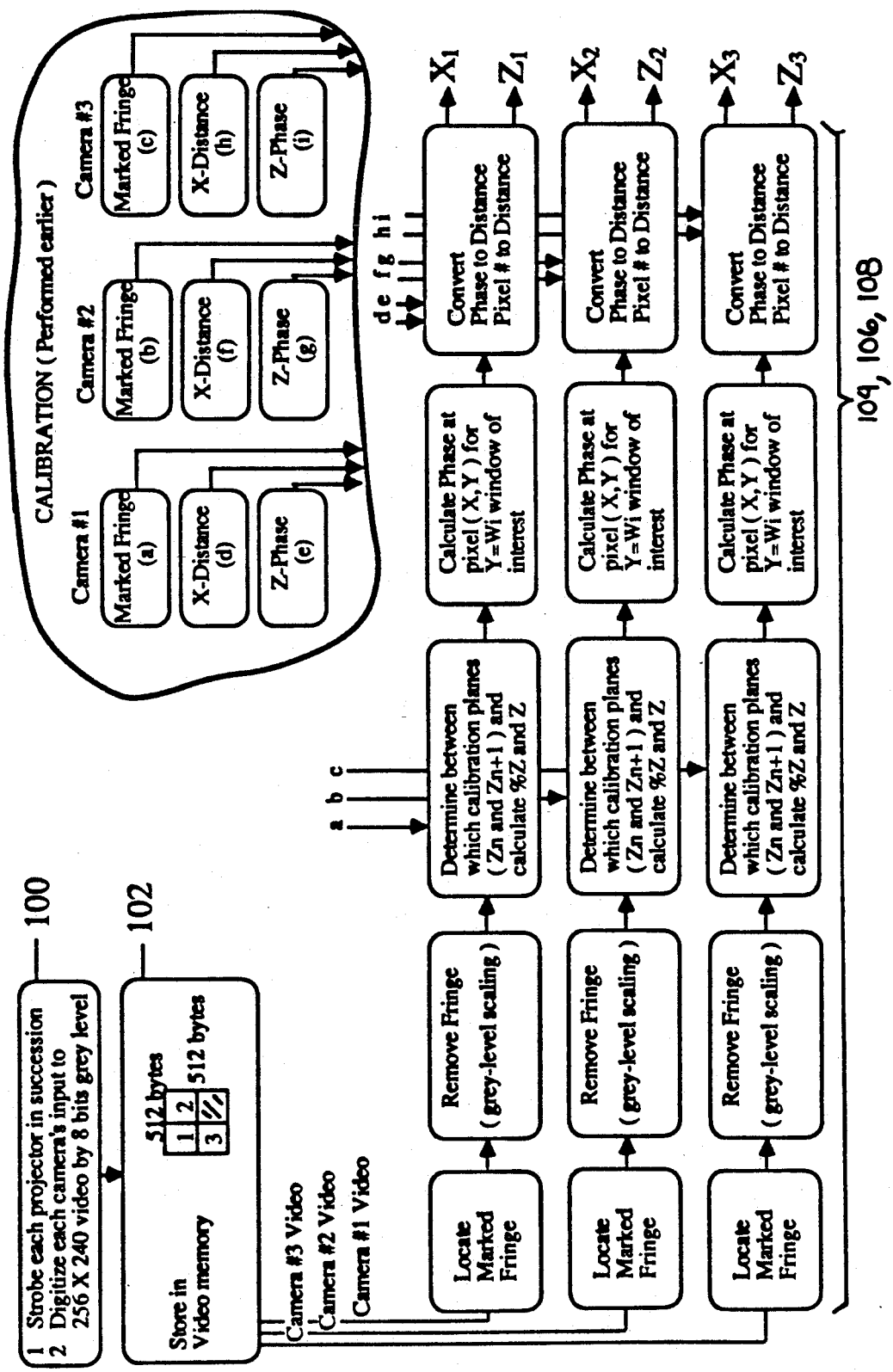
FIGS. 11A and B together constitute a functional block diagram of the profilometer system as implemented with the three sets of cameras and projectors which cover successive overlapping aspects of an object under test and the computer system as shown in FIGS. 1 and 2.

Referring to FIG. 11A the system is shown as configured during run time. The computer operates by strobing each of the projectors in each of the three camera projector assemblies in succession. The camera input is then digitized in a 256 by 240 byte array. Each byte has 8 bits to indicate the gray level (variations in intensity). The control function of strobing and digitization of the CCD arrays is indicated by the block 100. The computer stores the arrays from each of the 3 cameras in an area of 512 bytes by 512 bytes in a video memory section of the computer memory. This storage may be in random access memory (RAM) in the computer memory. The storage arrays for each camera (1-3) is indicated by block 102.

Figure 12A:
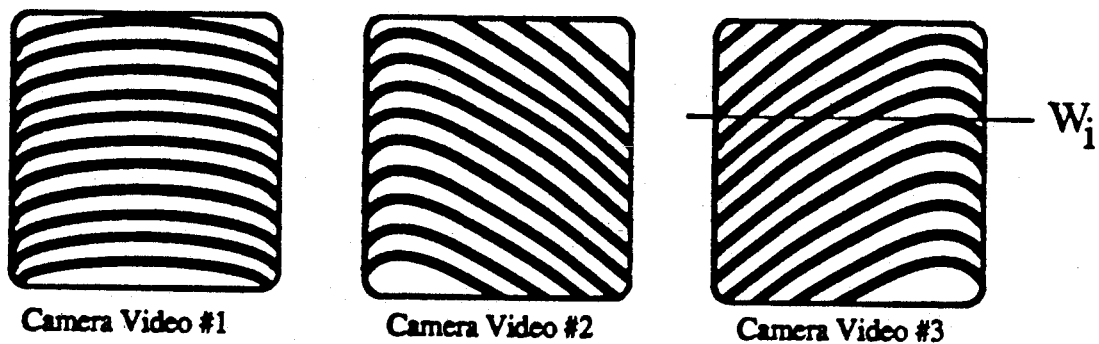
FIGS. 12A, B and C show.

In the case of a tubular object of elliptical cross-section where camera #1 views in a direction perpendicular to the major axis of the ellipse, the video camera sees a pattern such as indicated under #1 in FIG. 12A. Cameras #2 and #3 which are 120° apart have imaged thereon patterns shown under #2 and #3 in FIG. 12A. The calibration window which was referred to in FIGS. 5A, 6A and 7A is indicated at $W_i$ by way of example. The obtaining of the profile of the object at a cross-section perpendicular to the axis of the object which includes the window $W_i$ will be explained. It will be appreciated that this window may be one of several, if the entire surface profile of the object is to be derived.

Each camera utilizes a similar phase calculation and distance conversion subsystem 104, 106 and 108. The subsystem 104 for camera #1 is shown in detail. The marked fringe is first located using the bytes stored in the array for camera #1 in the video memory 102. The bytes are scanned along the column containing pixel 128 and the variations in gray level (intensity) vary sinusoidally except in the area of the marked fringe. The row containing the marked fringe location is located and flagged.

The fringe is removed by scaling the gray level of the byte representing the marked fringe so that the bytes along pixel 128 will vary sinusoidally in amplitude. The marked fringe is removed; however, it need not be removed, if it is not located in the window which includes the cross-section at which profile measurements are being made. If any of the other marked fringes are in any of the cross-sections, their gray level is scaled to restore the variation intensity and eliminate the effect of the marked fringe.

In the next part of the phase calculation and distance conversion, the phase at the marked fringe and the phase of the pattern at the window are determined. FIG. 6A and 8 above explained in general how this phase was measured and used to determine the phase at the object and convert that phase measurement to distance using equations (1) and (2).

Figure 13:
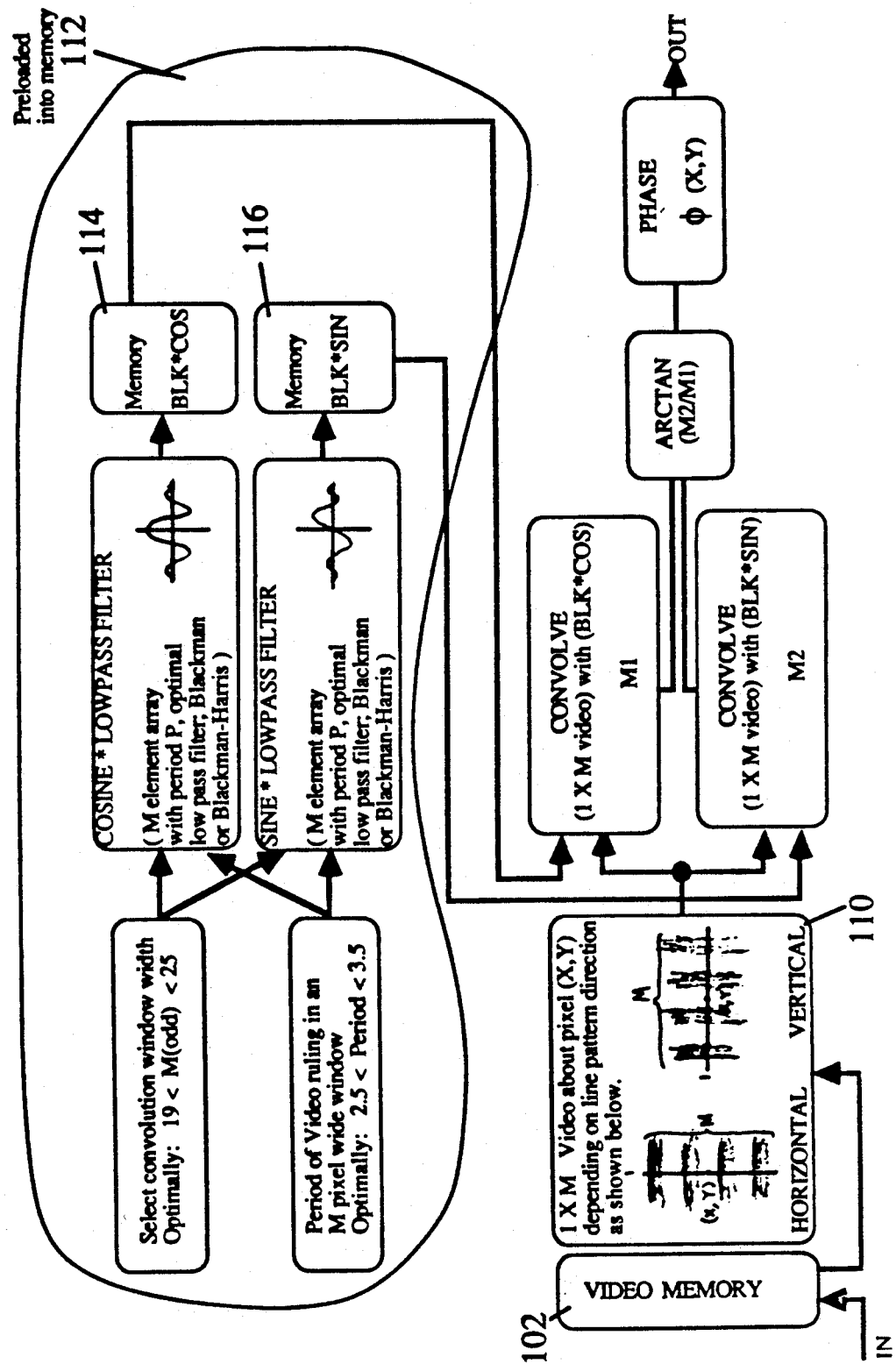
FIG. 13 is a functional block diagram illustrating in greater detail how the phase calculations are performed in the system illustrated in FIGS. 11A and 11B.

At this point spatial synchronous detection is used to measure the phase from the video information which is stored in the video memory. FIG. 13 illustrates the spatial synchronous detection phase measurement in general at a pixel location indicated as pixel (x, y,). The video memory 102 is used. The bytes contained in a window centered at pixel x,y are extracted. The window is vertical and may be one pixel wide by 25 pixels long. During x-calibration, as explained in connection with FIG. 5A, the window runs horizontally. The bytes in the window are indicated by block 110. The pixels in the window are convolved with sine and cosine attenuated functions which are stored in a cosine function memory and a sine function memory 114 and 116. The functions stored in these memories are obtained by selection of the convolution window width, the period of sinusoidal activity within the window, and a low pass filter function (e.g., Blackman or Blackman-Harris). As indicated above, a 25 pixel width is used; however, the width may vary depending upon the resolution requirements. The period of the pixels in the window are then known because of the period of the rulings in the projected grating. For example with the grating discussed above, there are generally 2½ to 3½ periods of the sinewave in a 25 pixel window.

From this information, sine and cosine functions are generated which are pure sine and cosines. These functions are multiplied by a digital filter function. The Womack article describes the use of Hamming filter function. It has been found that a Blackman filter or Blackman-Harris function is preferable. The cosine function and low pass filter generation processes provide the filtered sine and cosine functions which are stored in the memories 114 and 116 and are convolved with the bytes representing the pixels in the window 110. These are convolutions M1 and M2. M1 is the convolution of the pixel information shown at 110 which is extracted from the video memory 102 with the filtered cosine function. The other convolution, M2, is with the Blackman filtered sine function. The phase is determined by taking the arc tangent of these convolutions as discussed in the Womack article. This phase value is stored and represents the phase at pixel x, y. In this manner, the phase at the location of the marker fringe and at the location of the window for pixel 128 is determined.

This absolute phase is converted into cumulative phase by measuring the number of 360° transitions in phase between the marked fringe location and the window location. This is determined by the number peaks in the values of the intensity levels along the pixel 128 column. Using this cumulative phase information and the table which correlates cummulative phase of the marked fringes at each of the 32 planes $Z_0$ to $Z_{31}$, the numbers of the calibration planes between which the center of the surface of the object is located as well as the distance in the z direction from the origin $Z_0$) is determined. The marked fringe table is obtained during calibration by phase measurements upon the calibration target as shown in FIG. 15B and as discussed above in connection with FIGS. 6A and 8.

Figure 15A:
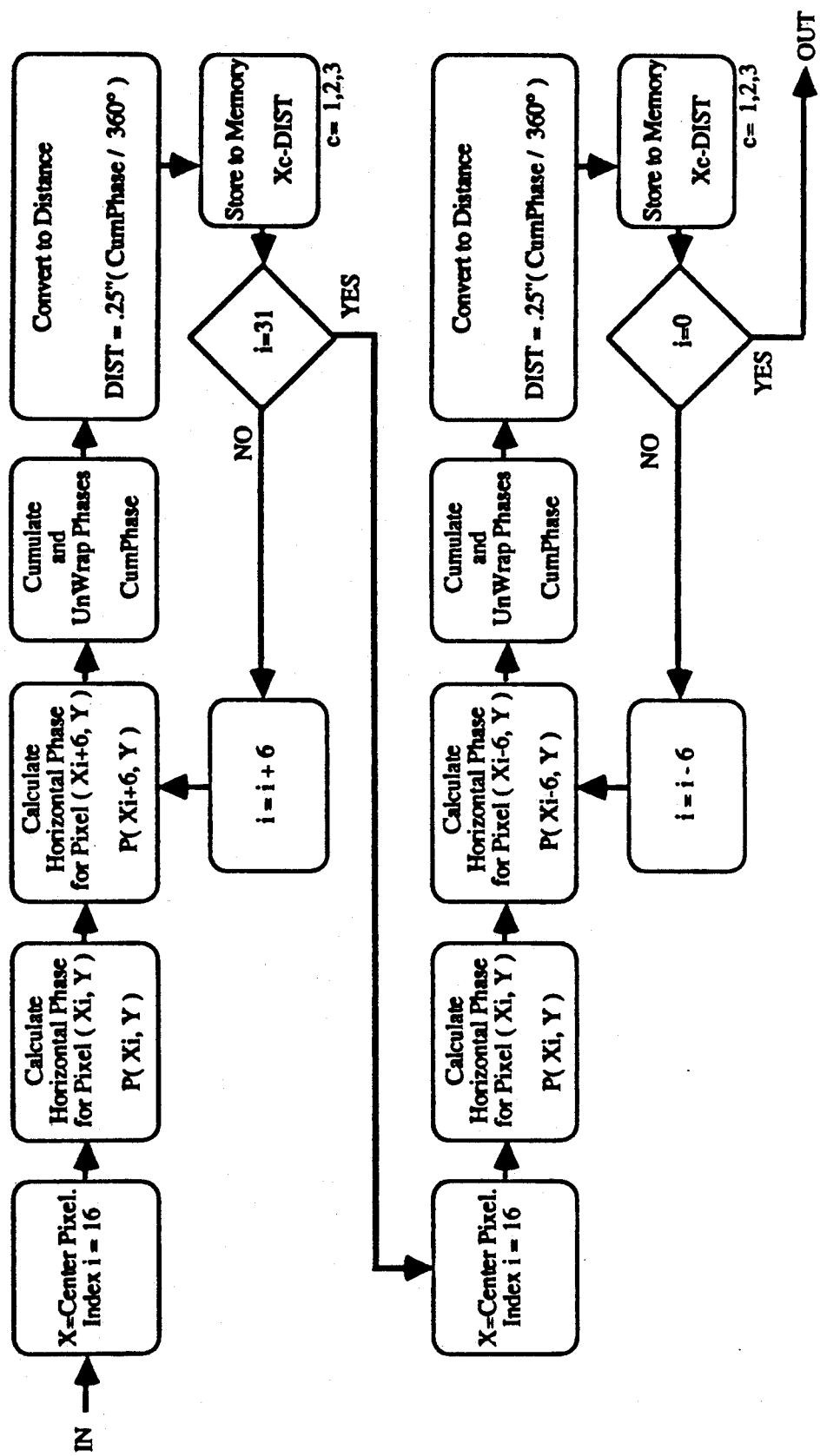
FIGS. 15A, 15B and 15C are functional block diagrams illustrating in greater detail the calibration, marker fringe table generation, and z calibration, respectively.
Figure 15B:
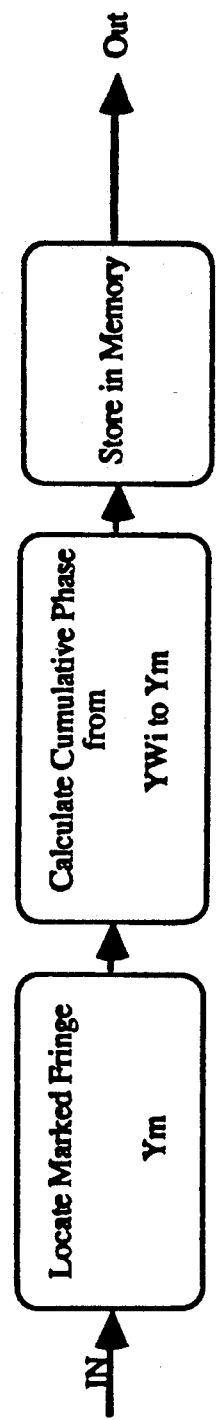

As shown in FIG. 15B, the marked fringe is located. Then a gray level scaling is applied to the pixels in the column along the center line to remove the modulation and intensity variation due to the marked fringe. From the remaining sinusoidal phase information, the cumulative phase from the marked fringe to the window is measured. This is the phase $\phi mf$. For each of the z planes, the $\phi_{mf}$ value is stored. These values are used to determine between which calibration planes (straddling Z planes) the image of the surface of the object at the center of the camera array lies.

Figure 12B:
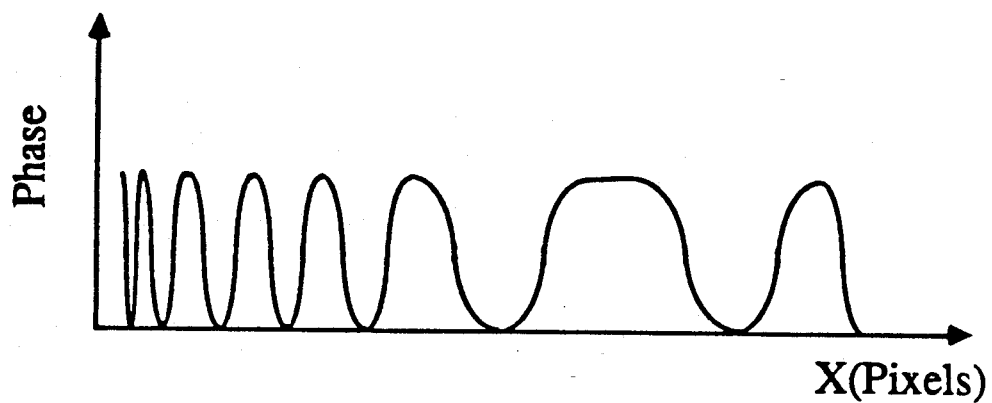
in FIG. 12B the variation in phase in the x direction cross a horizontal window $W_i$; and in FIG. 12C the distances in the z and x directions into which the phase information is converted through the use of calibration information.
Figure 12C:
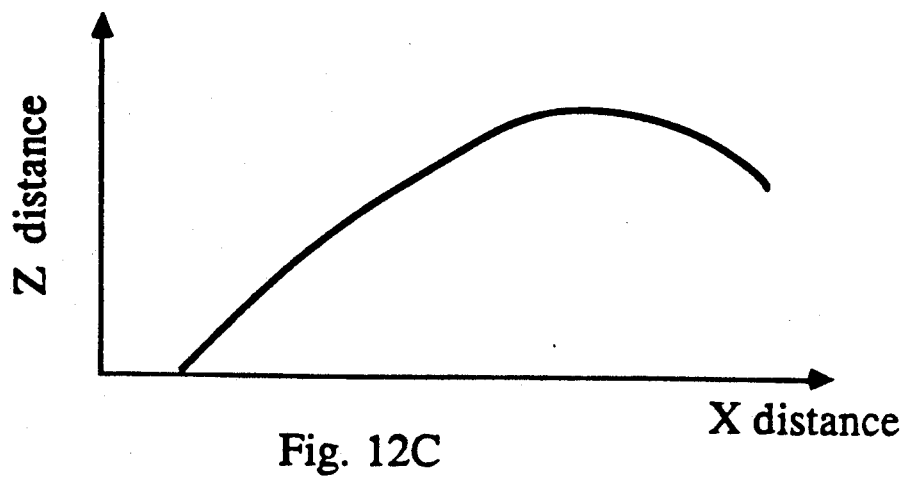

Next, the phase at all of the pixel positions in the window on both sides of the center pixel column is calculated using the synchronous detection technique discussed above. This provides phase values at each of the pixel positions x. This variation in phase for the image viewed by camera 3, as shown in FIG. 12A, is shown in FIG. 12B. These phase measurements are converted into absolute distance measurements utilizing the x and z calibration tables as explained in connection with FIG. 9.

In the event there are 32 windows of 32 data points in each of 32 calibration planes, there will be a matrix of 32 by 32 by 32 values for each camera; one matrix containing the x distance information and the other matrix containing the z phase information. There is also a smaller $1 \times 32 \times 32$ matrix containing fringe information. The x calibration information is obtained using the calibration target as explained in general above in connection with FIG. 5.

FIG. 15A shows how the 32 distance values are calculated for each of the windows. First the phase at the center pixel is calculated. Then the convolution window is moved over in 6 pixel steps and the phase at 15 additional pixels are calculated. These absolute measurements are then converted into unwrapped or cumulative phase measurements. The cumulative phase measurements are converted to distance since, $\frac{1}{4}$ inch corresponds to 360° of accummulated phase. The 32 values are stored in the memory. The procedure for calculating the 15 values start on one side of the center pixel (when i=31 starting from 16). Then the system is reset back to the center pixel and the convolution window is moved in 6 pixel steps until 16 more x values on the opposite side of the center are calculated. There are therefore 32 x distance values, 16 on one side of the center and 15 on the opposite side of the center, plus the center (a total of 32 x values). Accordingly, each of the 32 calibration planes has 32 by 32 x values; thus generating the 32 by 32 by 32 matricies discussed earlier.

Similar sets of 32 by 32 phase values are stored for each calibration plane in the other aspects. There are 32 planes for each camera, each 32 by 32 matrix may be considered to be a separate look-up table; thus for each camera there are 32 x distance look-up tables and 32 z phase look-up tables.

Figure 15C:
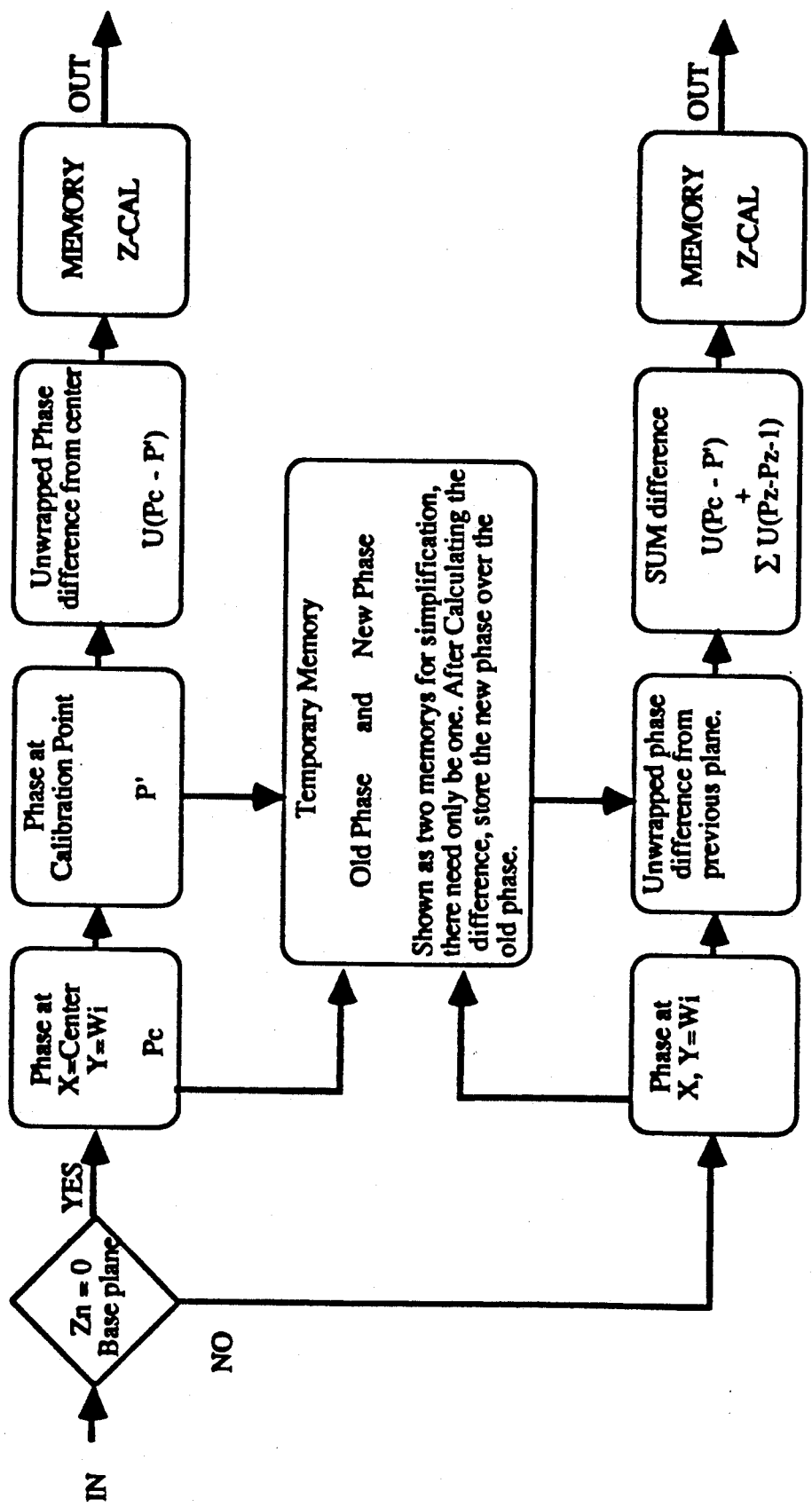

The z phase look-up tables are developed as discussed above in connection with FIGS. 7A and 7B. FIG. 15C shows how the z phase information at a window in a calibration plane is obtained. The procedure is modified for the base plane $Z=0$. At the base plane the phase is measured at the center pixel $p_c$ (pixel 128) and then at each calibration point. It will be noted that these calibration points may not necessarily be equally spaced at 6 pixels from the center due to the bars of the calibration target pattern. If a bar blocks the calibration point, the phase is measured at a unblocked point and interpolated back to the calibration point. Then an unwrapped phase difference calculation is made to develop the table of 32 values of z phase at the window $W_i$ for the base plane. The phase measurements at each calibration point in the base plane $Z_0$ is then used for developing the z phase values in the next reference plane, $Z_1$. The temporary memory stores the phase values in the preceeding planes so that unwrapped phase difference from the previous planes phase can be determined. The phase values are obtained by adding the phase difference in unwrapped phase from the previous plane to the phase values in the previous plane for each of the 32 calibration values in the x direction. Thus, FIG. 15C shows how the z phase values are obtained in the $Z_0$ plane as well as the z phase values for the same window in each of the other calibration planes.

Figure 14:
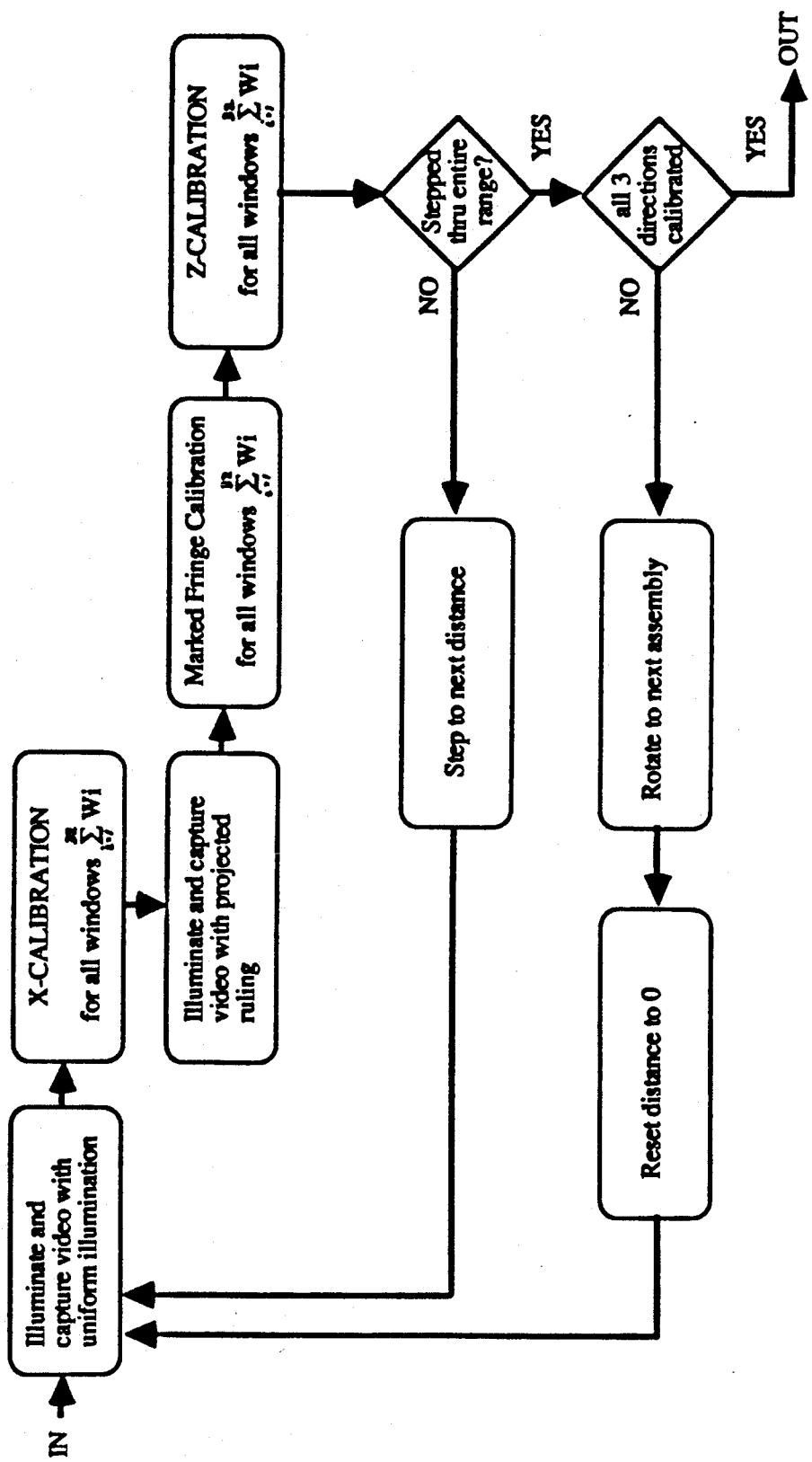
FIG. 14 is a functional block diagram illustrating the operation of the calibration system to obtain the tables in memory in the system shown in FIGS. 11A and 11B.

The total calibration operation is illustrated in FIG. 14. For x-calibration the calibration target is illuminated with the constant or uniform illumination from the incandescent light sources 46; the projectors of the Ronchi pattern being off. Then x-calibration is carried out for all windows in the first, $Z_0$ calibration plane. Then the projector is strobed and the marked fringe table is generated for all windows in the $Z_0$ plane. During this strobe the video memory has sufficient information to obtain the z phase calibration for all windows in the $Z_0$ plane. Then the stepper motor is turned on and the $Z_1$ plane is calibrated. Next the stepper motor steps the calibration target to the $Z_2$ and that plane is calibrated. After all 32 planes are calibrated the calibration target is rotated 120° to face the next camera projector assembly and reindexed back to the $Z_0$ position. The planes are recalibrated for the new camera/projector array. After all 32 calibration planes are calibrated for the second camera projector array the calibration target is rotated another 120° to face the third camera projector array and the 32 planes are again calibrated. All of the calibration information is stored in the tables.

The calibration target can then be removed and the system used for object profilometry in three dimensions. Once the system is calibrated, it may be recalibrated from time to time depending upon changes in alignments which may occur during use. For example in installations subject to vibration or other changes which may affect the positioning of the elements, recalibration may be needed more frequently than otherwise would be the case.

After the phase is calculated across the window from the objects surface, these phase measurements are converted into x and z distance measurements using the x and z phase tables as explained in connection with FIG. 9. It will be noted that the $\%Z = \%p_{128}$ which is the center pixel in the window. In the event that phase measurements are made at pixels other than those spaced 6 pixels apart, an interpolation program in z and x may be used to obtain the calibrated values in the z planes for the intermediate pixel positions. The distance conversion thus provides a family of x and z values at any cross-section of the object under test or at a plurality of cross-sections if more than one cross-section is to be measured.

Referring to FIG. 11A, since the object under test is imaged onto a number of pixels, there will be a number of x and z values in each aspect. The number of $X_1$ and $Z_1$ values equal to the number of pixels in camera #1 on which the object is imaged. Similarly there will be a number of $X_2$ and $Z_2$ values and $X_3$ and $Z_3$ values corresponding to the number of pixels in the second and third cameras on which the object is imaged.

Figure 11B:
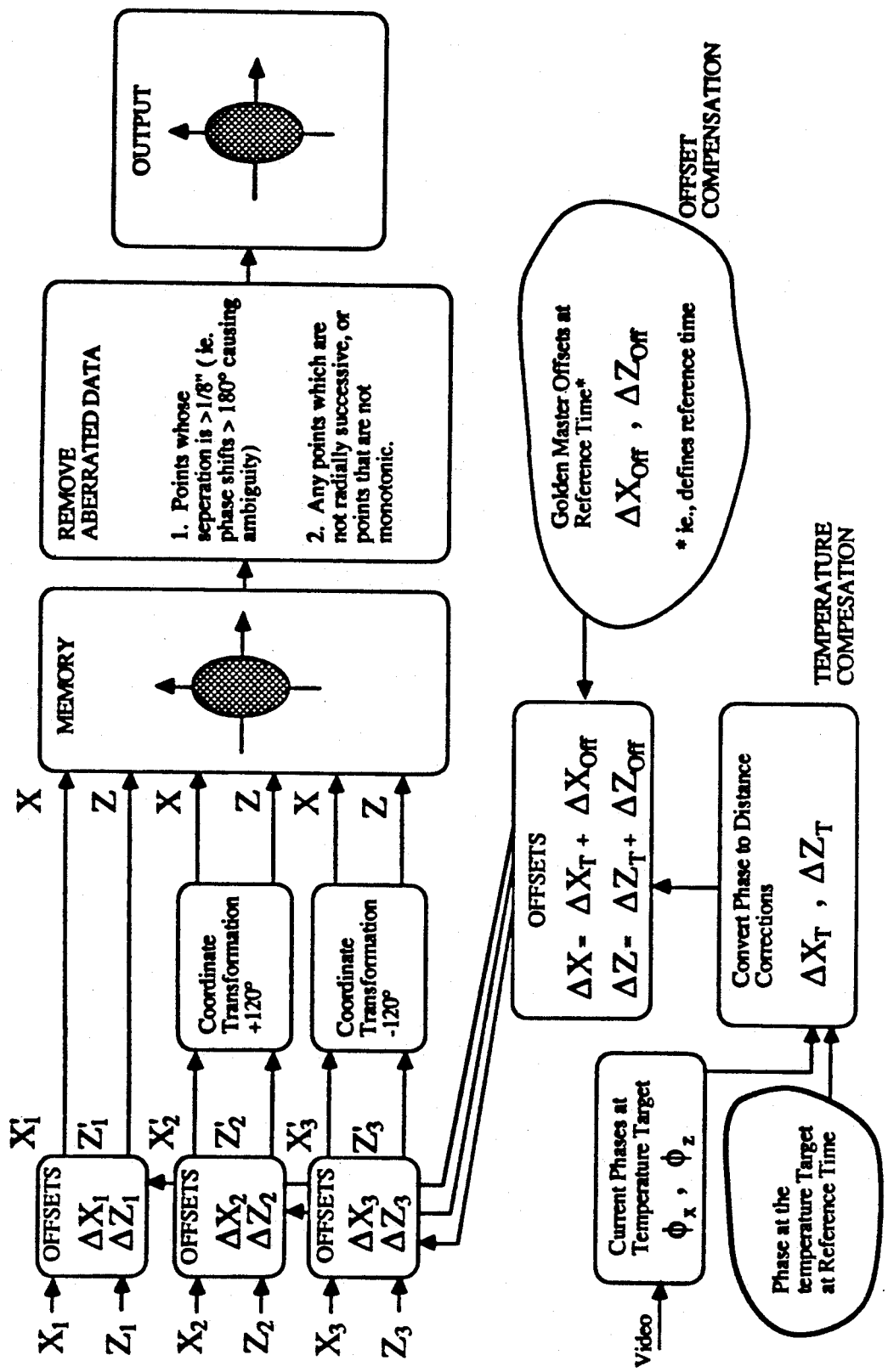

These values are then compensated for temperature variations and also for offsets as shown in FIG. 11B. The offsets are corrections that are used in merging the three cameras' coordinate systems. The offsets are measured through the use of a reference object, when the measurements are designed to compare the measured values with a standard. The standard object is then measured and the offsets from the known standard are stored in an offset table. This standard is referred to as a golden master and is measured at a reference time and temperature. The offset values are indicated as $\Delta X_{off}$ and $\Delta Z_{off}$.

The temperature change is also an offset. The temperature can be detected by the use of a target which remains in the system. This target has a pattern of lines similar to that of the calibration target but may be smaller, since only a phase measurement at a pixel position near the top of the CCD sensor array is used. This may be pixel 128 in row 12, or closer to the top if a smaller convolution window is used. The pixel used may be that closest to $P_{128}$ in row 12 which is at the intersection of bright areas between the projected grating and the temperature target ruling. Both the x and z measurements at this pixel position are used as an offset and added to the standard offset in an offset accumulator for each of the three aspects, with the offsets added to the values of x and z (or subtracted as the case may be) to provide new values $X'_1$, $Z'_1$; $X'_2$, $Z'_2$; and $X'_3$, $Z'_3$. In order to obtain an output in two dimensions, the $X'_2$, $Z'_2$ and $X'_3$, $Z'_3$ values are given +120° and −120° coordinate transformations, respectively. There are therefore a succession of x and z values for successive locations 360° about the cross-section. These x and z values are stored in memory.

The aspects overlap each other. In the overlapping areas some measurements are inconsistent.

For example a measurement of greater than ⅛ inch corresponds to a phase ambiguity and is considered aberrated data. If the data does not change monotonically (either increasing or decreasing), the probability is that the data is aberrated. Such data points are also removed. It may also be desirable, optionally and especially where the centroid of a cross-section is to be computed from the data, to remove any redundant data point. This will provide only data in the areas which do not overlap. The output data represents the cross-section of the object. It can be compared to standard cross-sections, either in area or along particular radii for the purpose of inspection and acceptance of parts. The distance measurements may also be used to provide machine vision inputs to robot arms which must move precisely with respect to the objects under test.

By way of summary the following provides a listing of the notation used above and the computations carried out by the system in obtaining the absolute measurements of dimensional coordinates of the profile of an object.

$\Delta Z$ Calibrated step size. May be any value as long as it results in phase changes from $Z_n$ to $Z_{n+1}$ less than 180°. This patent application uses $Z = \frac{1}{8}"$.

Z-CALIBRATION

P Accumulated phase to plane $Z_n$ (Just before the unknown distance)

P′ Accumulated phase to plane $Z_{n+1}$ (Just after the unknown distance)

MF-CALIBRATION $\phi MFzn$ Accumulated phase from $W_i$ to marked fringe for plane $Z_n$ $\phi Fzn+1$ Accumulated phase from $W_i$ to marked fringe for plane $Z_{n+1}$

RUN-TIME MEASUREMENTS $\phi 128$ Phase at center (X=128) for window $W_i$
$\phi MFp$ Accumulated phase from Wi to marked fringe
$\phi x$ Phase at pixel, (X, Y-Wi)
$U(\phi_x)$ Unwrapped phase

COMPUTATION

%Z Depth between planes $Z_n$ and $Z_{n+1}$ $$\%Z = (\phi mfz - \phi mfp)/(\phi mfz_n - \phi mfz_n + 1) \quad (1)$$

Z Distance $$(\text{viz.,} \Delta Z = Z - Z' = Z_n - Z_{n+1}) \quad (2)$$

$\Delta Z$ Size of the step or incremental distance between planes.

p128 Accumulated phase to unknown distance at the centr of the video. This is the link between the marked fringe calibration and the Z-calibration. Since P, P′ from the Z Calibration are known and %Z was found using equation (1), we can find p128.

$$p128 = P + \%Z(P' - P) \quad (3)$$

To calculate phase at pixels past the center, and then extract the distance, the following procedure is performed Calculate Unwrapped phase, difference $$U(\Delta \phi) = U(\phi_x - \phi_{x-1}) \quad (4)$$

Calculate Total phase difference $$P_x - p_{x-1} U(\Delta 0) \quad (5)$$

Calculate %px $$\%p_x = (P - p_x)/(P - P') \quad (6)$$

Calculate Distance $$Z_x = Z + \%px(Z - Z') \quad (7)$$

While an exemplary embodiment of the invention has been disclosed, variations and modification thereof within the scope of the invention will undoubtedly suggest themselves to those skilled in the art. For example, for objects which are not cylindrical the phase measurements may be made using temporal synchronous detection rather than spatial synchronous detection, for example translating the projected grating and measuring the relative phase shifts at each translation. Accordingly the foregoing description should be taken as illustrative and not in a limiting sense.

We claim:

1. A method for measuring the profile of an object by digital moire interferometry which comprises the following steps: calibrating a volume in space in which volume the object is disposed during measurement to provide reference phase information identifying the locations in distance from an origin of a coordinate system of a multiplicity of sets of positions in said volume, each of said sets being in a different one of a multiplicity of parallel planes spaced a known distance from each other in said volume; obtaining phase information from the profile of said object in said volume at said plurality of positions; identifying from the phase information obtained from said profile, the ones of said planes on opposite sides of said profile; and determining from the differences between said phase information from said profile and said sets of phase information for said planes on said opposite sides of said profile absolute distance measurements of the dimensions of said profile, at least through a cross-section thereof.

2. The method according to claim 1 wherein said object is three dimensional and said calibrating step is by repeating said calibrating step for a plurality of angularly offset aspects rotated about said calibration axis in the plane at the origin of the coordinate system of said volume, a different plurality of said parallel planes in each of said aspects being perpendicular to radial lines through an axis of rotation, the angular offset being the angle between said radial lines.

3. The method according to claim 2 wherein there are at least three of said aspects and said angle is 120°.

4. A method for measuring the profile of an object by digital moire interferometry which comprises the following steps: calibrating a volume in space in which volume the object is disposed during measurement to provide reference phase information identifying the locations in distance from an origin of a coordinate system of a plurality of sets of positions in said volume, each of said sets being in a different one of a plurality of parallel planes spaced a known distance from each other in said volume; obtaining phase information from the profile of said object in said volume at said plurality of positions; identifying from the phase information obtained from said profile, the ones of said planes on opposite sides of said profile; determining from the differences between said phase information from said profile and said sets of phase information for said planes on said opposite sides of said profile absolute distance measurements of the dimensions of said profile, at least through a cross-section thereof; and wherein said calibrating step is carried out by illuminating a target having a pattern of lines spaced from each other and paralleling a first of three orthogonal axes; deriving a plurality of first tables each containing data representing a matrix of values representing distances from phase variations in the intensity of light reflected from said target at said set of positions from each of said plurality of said planes, said set of positions being along a second of said orthogonal axes which is also perpendicular to said lines of said target, said planes being spaced along a third of said orthogonal axes, each of said tables being derived with said target pattern disposed in a different one of said plurality of parallel planes; projecting a ruling having a plurality of spaced parallel lines upon said target pattern so that the lines of said ruling are perpendicular to the lines of said target; optically making at least a predetermined one of said ruling lines; deriving a table containing data representing the difference in the phase of the variations in the intensity of the reflected light from said marked line and from a window spaced at a predetermined position along said first axis, said last named table identifying the positions of each of said planes along said third of said orthogonal axes; deriving a second plurality of tables each containing data representing a matrix of phase information derived from the variations in the intensity of light reflected from said target pattern with said ruling projected thereon at said set of positions in each of said plurality of planes; and said step of determining said dimensions comprising the steps of deriving said dimensions of said profile along said second axis from those of said first plurality of tables for planes straddling said profile and from the phase information from said object, and deriving said dimensions along said third of said axes from those of said second plurality of tables for the planes straddling said profile and from the phase information from said object.

5. The method according to claim 4 further comprising rotating said target about an axis of rotation parallel to said first axis to a plurality of angularly spaced portions and moving said target along said third axis to position said pattern in each of said planes, and carrying out said steps for deriving said tables at each of said planes in each of said angularly spaced positions.

6. The method according to claim 4 wherein said phase information is obtained by illuminating a camera having a sensor defining a matrix of pixel positions along said first and second axes, deriving digital data signals from each of said positions, convolving said digital data from those of said positions in successive areas, each constituting a convolution window, with digital signals representing sine and cosine functions to provide digital outputs, and deriving said phase information in accordance with said digital outputs.

7. The method according to claim 4 whereby said first axis is a vertical y axis, said second axis is a horizontal x axis, and said third axis is a horizontal z axis.

8. The method according to claim 4 wherein said optical marking step is carried out by projecting a marked area at said predetermined one line.

9. The method according to claim 8 wherein said marking step is carried out by projecting a plurality of said marked areas, one at said predetermined line and another at a line spaced a predetermined number of lines from said predetermined one line, each of said areas having different intensity of illumination.

10. The method according to claim 9 wherein said marking step is carried out by projecting a plurality of said marked areas spaced from each other along said marked lines, at least one of said areas being centrally disposed of its respective line.

11. The method according to claim 8 further comprising the steps obtaining said phase information from a camera defining a matrix of pixel positions along said first and second axis, deriving digital data signals from said positions, processing said digital data signals to remove the variation in value thereof at positions corresponding to said marked area, and obtaining said phase information from said digital data signals from which said variation in value due to said marked area has been removed.

12. The method according to claim 4 wherein said steps of deriving said phase information is carried out in terms of unwrapped phase by accumulating phase at a preceding position, 360° of phase times the number of lines between said preceding and a succeeding position, and the phase at said succeeding position.

13. The method according to claim 12 wherein said optical marking step is carried out by marking said predetermined line in a region of said ruling approximately at the center of said line, the first said preceding position being that of said region.

14. The method according to claim 4 further comprising the step of deriving an offset distance measurements in said volume, and correcting the distances derived from said profile of said object in accordance with said offset distance measurements.

15. The method according to claim 14 wherein said offset distance measurements are obtained by illuminating a target in said volume having a pattern of lines thereon to obtain offsets corresponding to temperature variation.

16. The method according to claim 14 whereby said offset distance measurements are obtained from an object of reference profile, using the steps set forth in claim 4.

17. A system for measuring the profile of an object by digital moire interferometry which comprises means for calibrating a volume in space which volume the object is disposed during measurement to provide reference phase information identifying the locations of a multiplicity of sets of positions in said volume, each of said sets being in a different one of a multiplicity of parallel calibration planes spaced from each other in said volume; means for obtaining phase information from the profile of said object in said volume at said plurality of positions; means for identifying from the phase information obtained from said profile, the ones of said calibration planes on opposite sides of said profile; and means for determining from the differences between said phase information for said calibration planes on said opposite sides of said profile absolute distance measurements of the dimensions of said profile, at least through a cross-section thereof.

18. The system according to claim 17 wherein said object is three dimensional and said calibrating means includes means for calibrating said volume in a plurality of angularly offset aspects of said volume, a different plurality of said parallel planes in each of said aspects being perpendicular to radial lines through an axis of rotating, the angular offset being the angle between said radial lines.

19. The system according to claim 18 wherein there are at least three of said aspects and said angle is 120°.

20. A system for measuring the profile of an object by digital moire interferometry which comprises means for calibrating a volume in space which volume the object is disposed during measurement to provide reference phase information identifying the locations of a plurality of sets of positions in said volume, each of said sets being in a different one of a plurality of parallel calibration planes spaced from each other in said volume; means for obtaining phase information from the profile of said object in said volume at said plurality of positions; means for identifying from the phase information obtained from said profile, the ones of said calibration planes on opposite sides of said profile; means for determining from the differences between said phase information from said profile and said sets of phase information for said calibration planes on said opposite sides of said profile absolute distance measurements of the dimensions of said profile, at least through a cross-section thereof; and wherein said calibrating means comprises a target having a pattern of lines spaced from each other and paralleling a first of three orthogonal axes; means for illuminating said target, means for deriving a plurality of first tables each containing data representing a matrix of distance values derived from the phase variations in the intensity of light reflected from said target at said set of positions from each of said plurality of said planes, said set of positions from each of said plurality of said planes, said set of positions being along a second of said orthogonal axes which is also perpendicular to said lines of said target, said planes being spaced along a third of said orthogonal axes, each of said tables being derived with said target pattern disposed in a different one of said plurality of parallel planes; means for projecting a ruling having a plurality of spaced parallel lines upon said target pattern so that the lines of said ruling are perpendicular to the lines of said target; means for optically marking at least a predetermined one of said ruling lines; means for deriving a table containing data representing the difference in the phase in the intensity of the light reflected from said marked line and at a predetermined position in a window spaced at a predetermined position perpendicular to the projected lines, said last named table identifying the positions of each of said planes along said third of said orthogonal axes; means for deriving a second plurality of tables each containing data representing a matrix of phase information from light reflected from said target pattern with said ruling projected thereon at said set of positions in each of said plurality of planes; and said means for determining said dimensions comprising means for deriving said dimensions comprising means for deriving said dimensions of said profile along said second axis from those of said first plurality of tables for planes straddling said profile and from the phase information from said object, said means for deriving said dimensions along said third of said axes from those of said second plurality of tables for the planes straddling said profile and from the phrase information from said object.

21. The system according to claim 20 further comprising means for rotating said target about an axis of rotation parallel to said first axis to a plurality of angularly spaced portions and moving said target along said third axis to position said pattern in each of said planes, and means for deriving said tables at each of said planes in each said angularly spaced positions.

22. The system according to claim 20 wherein said calibrating means and said means for obtaining phase information from said profile of said object comprises a camera having a sensor defining a matrix of pixel positions along said first and second axes, means for deriving digital data signals from each of said positions, means for convolving said digital data from those of said positions in successive areas, each constituting a convolution window, with digital signals representing sine and cosine functions to provide digital outputs, and means for deriving said phase information in accordance with said digital outputs.

23. The system according to claim 20 whereby said first axis is a vertical y axis said second axis is a horizontal x axis, and said third axis is a horizontal z axis.

24. The system according to claim 20 wherein said optical marking means includes means for projecting a marked area at said predetermined one line.

25. The system according to claim 24 wherein said marking means includes means for projecting a plurality of said marked areas, one at said predetermined line and another at a line spaced a predetermined number of lines from said predetermined one line, each of said areas having different intensity of illumination.

26. The system according to claim 25 wherein said marking means includes means for projecting a plurality of said marked areas spaced from each other along said marked lines, at least one of said areas being centrally disposed of its respective line.

27. The system according to claim 24 wherein said calibrating means and said means for obtaining said phase information the profile of said object comprises a camera defining a matrix of pixel positions along said first and second axis, means for deriving digital data signals from said positions, means for processing said digital data signals to remove the variation in value thereof at positions corresponding to said marked area, and means for obtaining said phase information from said digital data signals from which said variation in value due to said marked area has been removed.

28. The system according to claim 20 wherein said calibrating means includes means for deriving said phase information in terms of unwrapped phase having means for accumulating phase at a preceding position, 360° of phase times the number of lines between said preceding and a succeeding position, and the phase at said succeeding position.

29. The system according to claim 28 wherein said optical marking means includes means operative for marking said predetermined line in a region of said ruling approximately at the center of said line, the first said preceding position being that of said region.

30. The system according to claim 20 further comprising means for deriving offset distance measurements in said volume, and means for correcting the distances derived from said profile of said object in accordance with said offset distance measurements.

31. The system according to claim 30 wherein said offset distance measurements deriving means includes another target in said volume adjacent the object under test, said other target having a pattern of lines thereon, means for illuminating said other target in said volume to obtain offsets corresponding to temperature variation.

32. The system according to claim 30 whereby said offset distance deriving means includes an object of reference profile, and the means set forth in claim 20 for deriving said distances.

33. A method for measuring the profile of an object by digital Moire interferometry which comprises the following steps: calibrating a volume in space in which volume the object is disposed during measurement to provide reference phase information identifying the locations and distance from an origin of a coordinate system of a plurality of sets of positions in said volume, each of said sets being in a different one of a plurality of parallel planes spaced a known distance from each other in said volume; obtaining phase information from the profile of said object in said volume at said plurality of positions; identifying from the phase information obtained from said profile, the ones of said planes on opposite sides of said profile; determining from the differences between said phase information from said profile and said sets of phase information from said planes on said opposite sides of said profile absolute distance measurements of the dimensions of said profile, at least to a cross-section thereof; and wherein said phase information is obtained by detecting the interference fringes between a target at each of said positions and a projected image both of which have spaced lines and one of which has a marked line which provides a marked fringe.

34. The method according to claim 33 wherein said identifying step is carried out using the phase information detected from said marked fringe, and said determining step is carried out by interpolation.

35. The method according to claim 33 wherein said detecting step is carried out with a plurality of said marked lines which provide a plurality of marked fringes which are spaced from each other.

* * * * *